United States Patent
Yamakage

(10) Patent No.: US 11,252,215 B2
(45) Date of Patent: Feb. 15, 2022

(54) BROADCASTING SYSTEM, ENCODER, MULTIPLEXING APPARATUS, MULTIPLEXING METHOD, SYSTEM SWITCHING APPARATUS, AND SYNCHRONIZATION CONTROL APPARATUS

(71) Applicants: Kabushiki Kaisha Toshiba, Minato-ku (JP); Toshiba Infrastructure Systems & Solutions Corporation, Kawasaki (JP)

(72) Inventor: Tomoo Yamakage, Yokohama (JP)

(73) Assignees: Kabushiki Kaisha Toshiba, Minato-ku (JP); Toshiba Infrastructure Systems & Solutions Corporatio, Kawasaki (JP)

( * ) Notice: Subject to any disclaimer, the term of this patent is extended or adjusted under 35 U.S.C. 154(b) by 0 days.

(21) Appl. No.: 16/722,461

(22) Filed: Dec. 20, 2019

(65) Prior Publication Data

US 2020/0213381 A1    Jul. 2, 2020

(30) Foreign Application Priority Data

Dec. 28, 2018 (JP) .............................. JP2018-246850

(51) Int. Cl.
*H04J 3/06* (2006.01)
*H04L 29/06* (2006.01)

(52) U.S. Cl.
CPC ............ *H04L 65/80* (2013.01); *H04J 3/0697* (2013.01); *H04L 65/4076* (2013.01); *H04L 65/608* (2013.01)

(58) Field of Classification Search
CPC ... H04L 65/80; H04L 65/4076; H04L 65/608; H04L 65/607; H04J 3/0697; H04J 3/0667; H04N 21/2381; H04N 21/6437; H04N 21/242
See application file for complete search history.

(56) References Cited

U.S. PATENT DOCUMENTS

| | | | |
|---|---|---|---|
| 7,412,533 B1 * | 8/2008 | Johnson | H04L 12/1827 709/231 |
| 10,320,508 B2 * | 6/2019 | Shimizu | H04N 21/242 |

(Continued)

FOREIGN PATENT DOCUMENTS

| JP | 2015-207984 A | 11/2015 |
|---|---|---|
| JP | 2018-037885 A | 3/2018 |

(Continued)

OTHER PUBLICATIONS

Montagud et al., "Media Sync, Handbook on Multimedia Synchronization", Mar. 2018, Springer (Year: 2018).*

(Continued)

*Primary Examiner* — Eyob Hagos
(74) *Attorney, Agent, or Firm* — Oblon, McClelland, Maier & Neustadt, L.L.P.

(57) ABSTRACT

A multiplexing method including: receiving a TS over IP packet from a plurality of encoders which are disposed at physically remote places, or which are disposed in a virtual environment on a cloud computing system where physical locations are unidentifiable; performing multiplexing after compensating for a delay and jitter of a transmission path, based on a timestamp which is stamped on an RTP header of the TS over IP packet; and performing, with respect to a PCR packet, either multiplexing after compensating for the delay and the jitter, based on a time re-generated in a multiplexing apparatus, or multiplexing by generating a PCR packet in the multiplexing apparatus.

10 Claims, 18 Drawing Sheets

(56) References Cited

U.S. PATENT DOCUMENTS

| | | | | |
|---|---|---|---|---|
| 2009/0232165 A1* | 9/2009 | Ishida | H04N 21/242 | 370/503 |
| 2010/0254408 A1* | 10/2010 | Kuno | H04N 21/4334 | 370/474 |
| 2011/0261917 A1* | 10/2011 | Bedrosian | H04J 3/0697 | 375/371 |
| 2012/0082433 A1* | 4/2012 | Kelly | G11B 27/28 | 386/241 |
| 2016/0182973 A1* | 6/2016 | Winograd | H04N 21/4722 | 725/25 |
| 2017/0012765 A1* | 1/2017 | Kitazato | H04J 3/0664 | |
| 2017/0041025 A1* | 2/2017 | Murakami | H03M 13/1111 | |
| 2018/0124451 A1* | 5/2018 | Takahashi | H04N 21/8547 | |
| 2018/0220169 A1* | 8/2018 | Yang | H04N 21/8586 | |
| 2019/0069046 A1* | 2/2019 | Sauer | H04L 65/601 | |
| 2019/0319776 A1 | 10/2019 | Yamakage | | |

FOREIGN PATENT DOCUMENTS

| | | | | |
|---|---|---|---|---|
| JP | 2019-186812 A | 10/2019 | | |
| WO | WO-2014188960 A1 * | 11/2014 | | H04N 21/434 |
| WO | WO 2017/026248 A1 | 2/2017 | | |

OTHER PUBLICATIONS

SMPTE ST 2059-1, SMPTE ST 2059-1—": Generation and Alignment of Interface Signals to the SMPTE Epoch", The Society of Motion Picture and Television Engineers, 2015 ,31 pages.

Sato, A, et al., "Development of MPEG-2 TS Multiplex Equipment", NEC Technical Journal, vol. 57, No. 4, 2004, 10 pages (with English Translation).

SMPTE ST 2022-2, ST 2022-2:2007—"Unidirectional Transport of Constant Bit Rate MPEG-2 Transport Streams on IP Networks" (copy of reference unavailable ; submitting Statement of Relevancy only).

SMPTE ST 2110-10, ST 2110-10—"System architecture and synchronization". Synchronization is based on SMPTE 2059 (copy of reference not available; submitting Statement of Relevancy only).

RFC 3550, Schulzrinne, H, et al., Internet Standard, "RTP: A Transport Protocol for Real-Time Applications", 2003, 116 pages.

IPTVFJ STD-0009, Standards, operating rules (STD) "BS digital broad casting IP retransmission operation regulation 1.3 Revised", General IPTV Forum, Jul. 18, 2017 (copy of reference not available).

ISO/IEC 13818-1, International Standard, "Information Technology-Generic coding of moving pictures and associated audio Information: Systems", Dec. 2000, 174 pages.

* cited by examiner

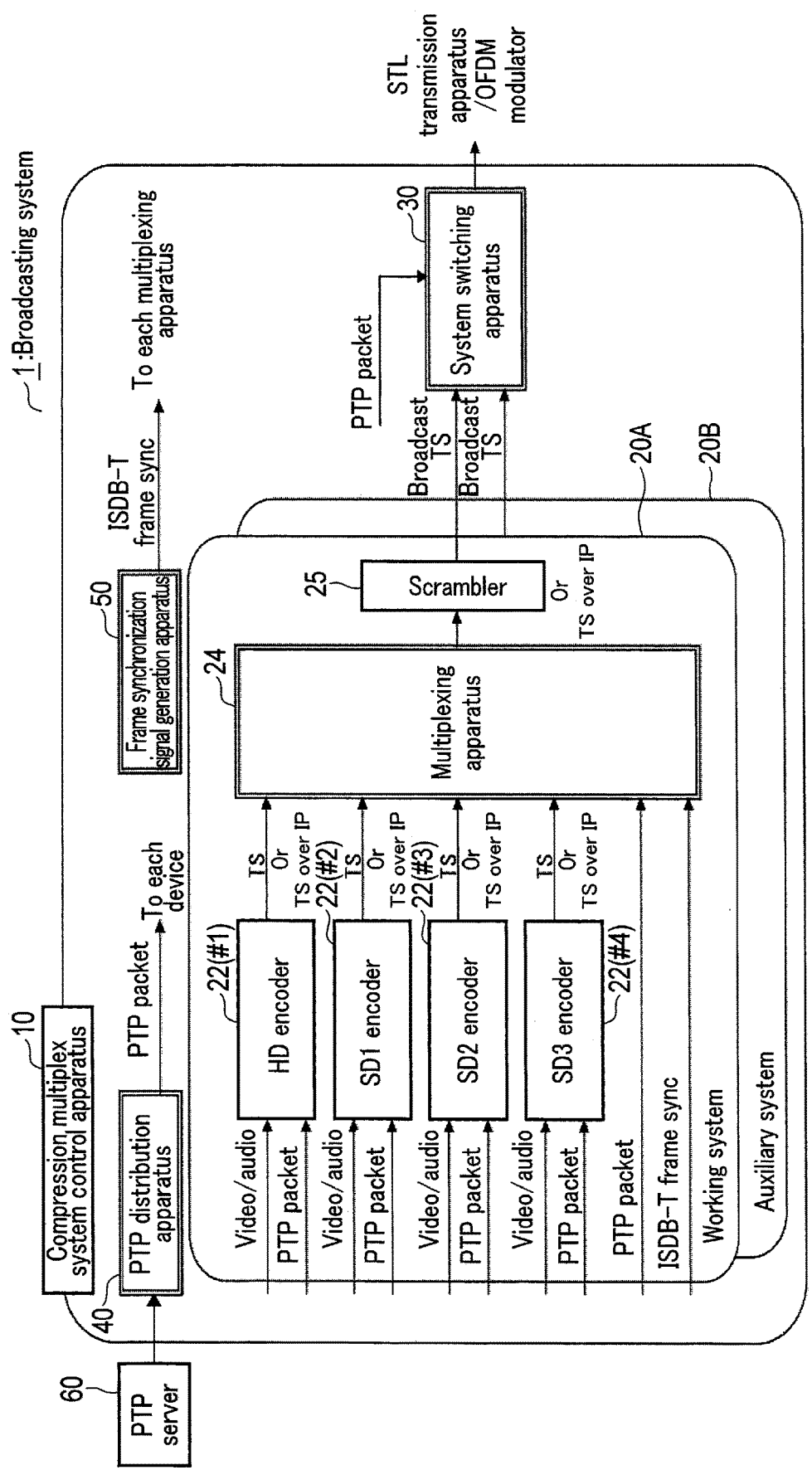
F I G. 1

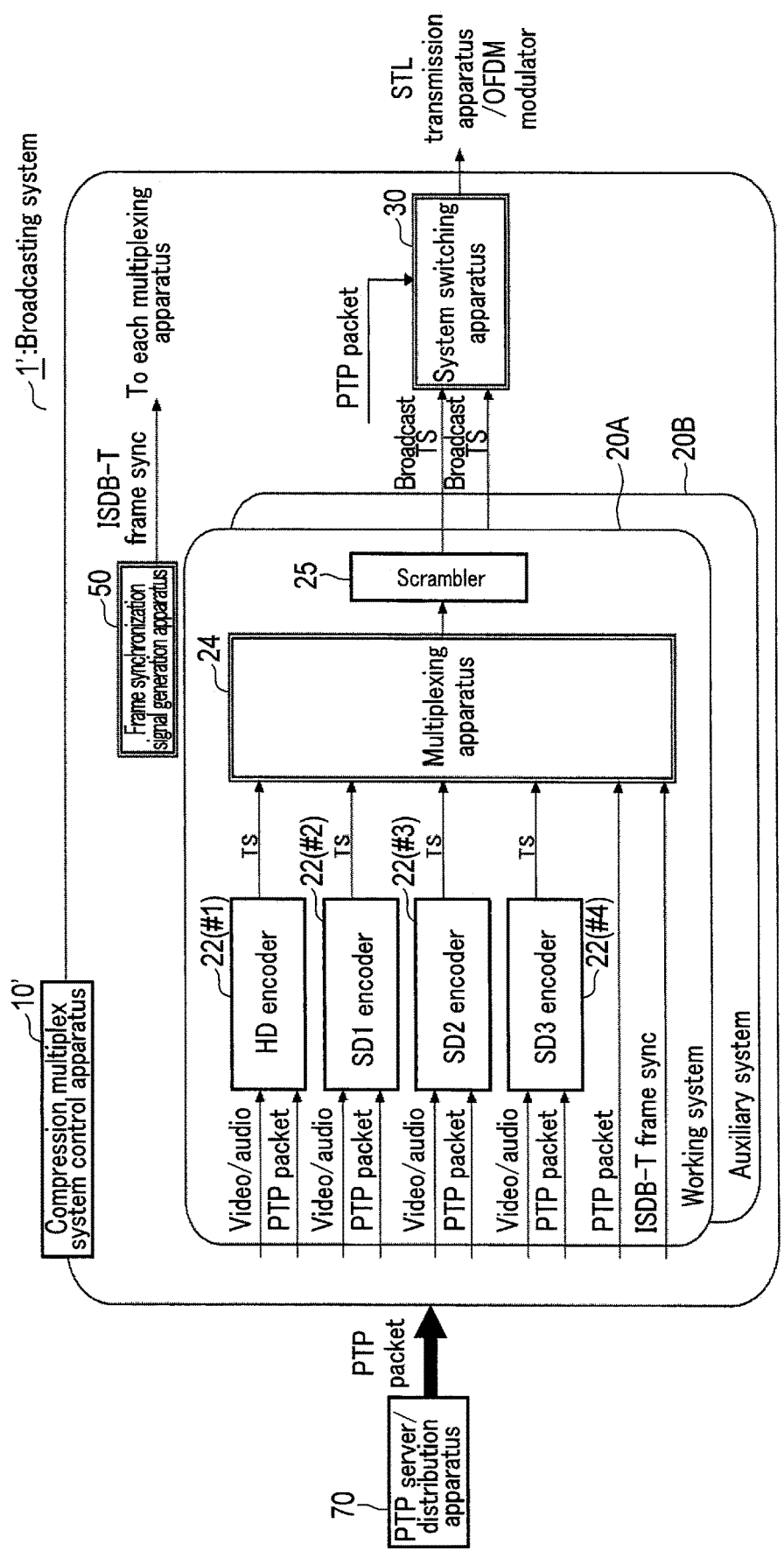
F I G. 2

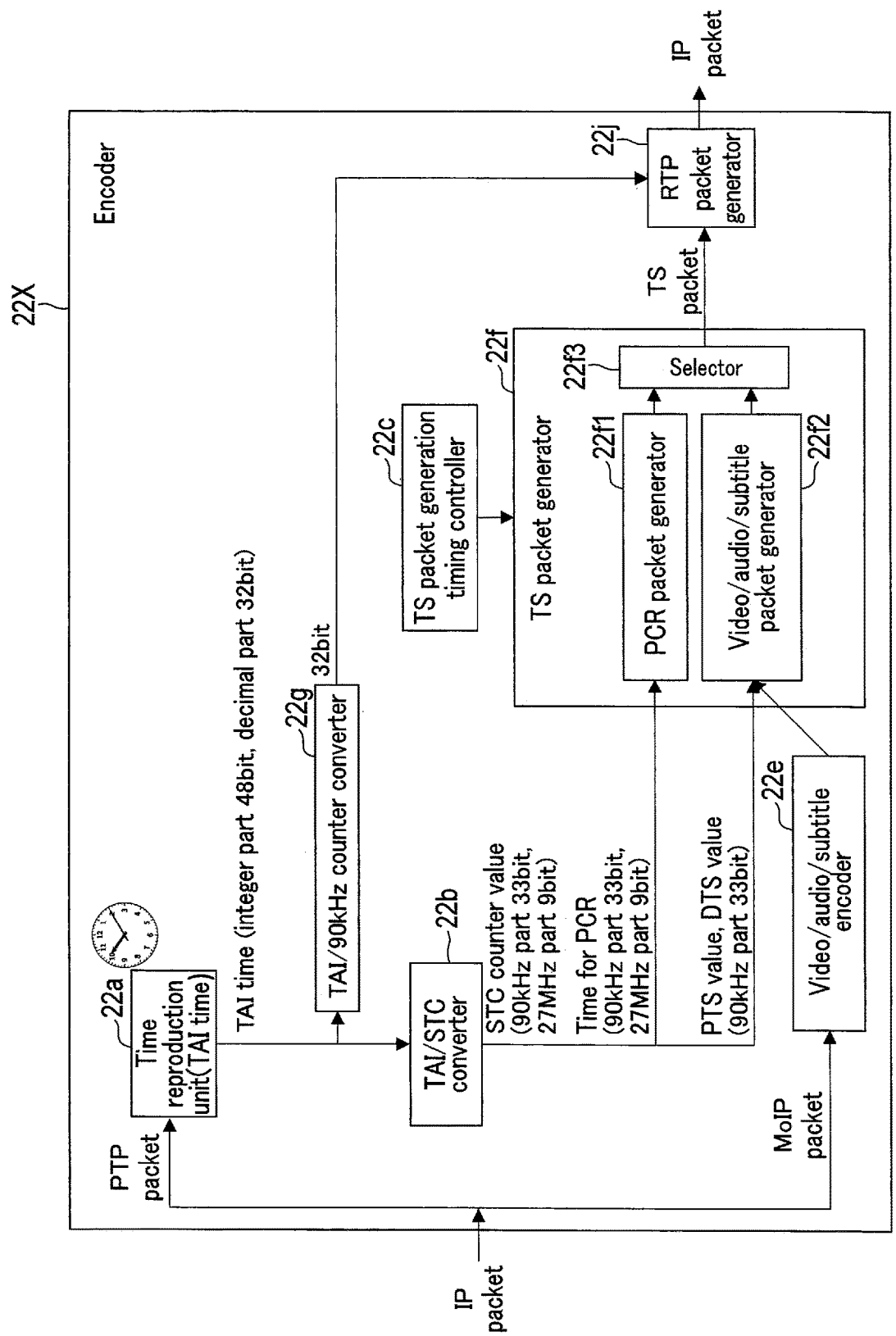
F I G. 3A

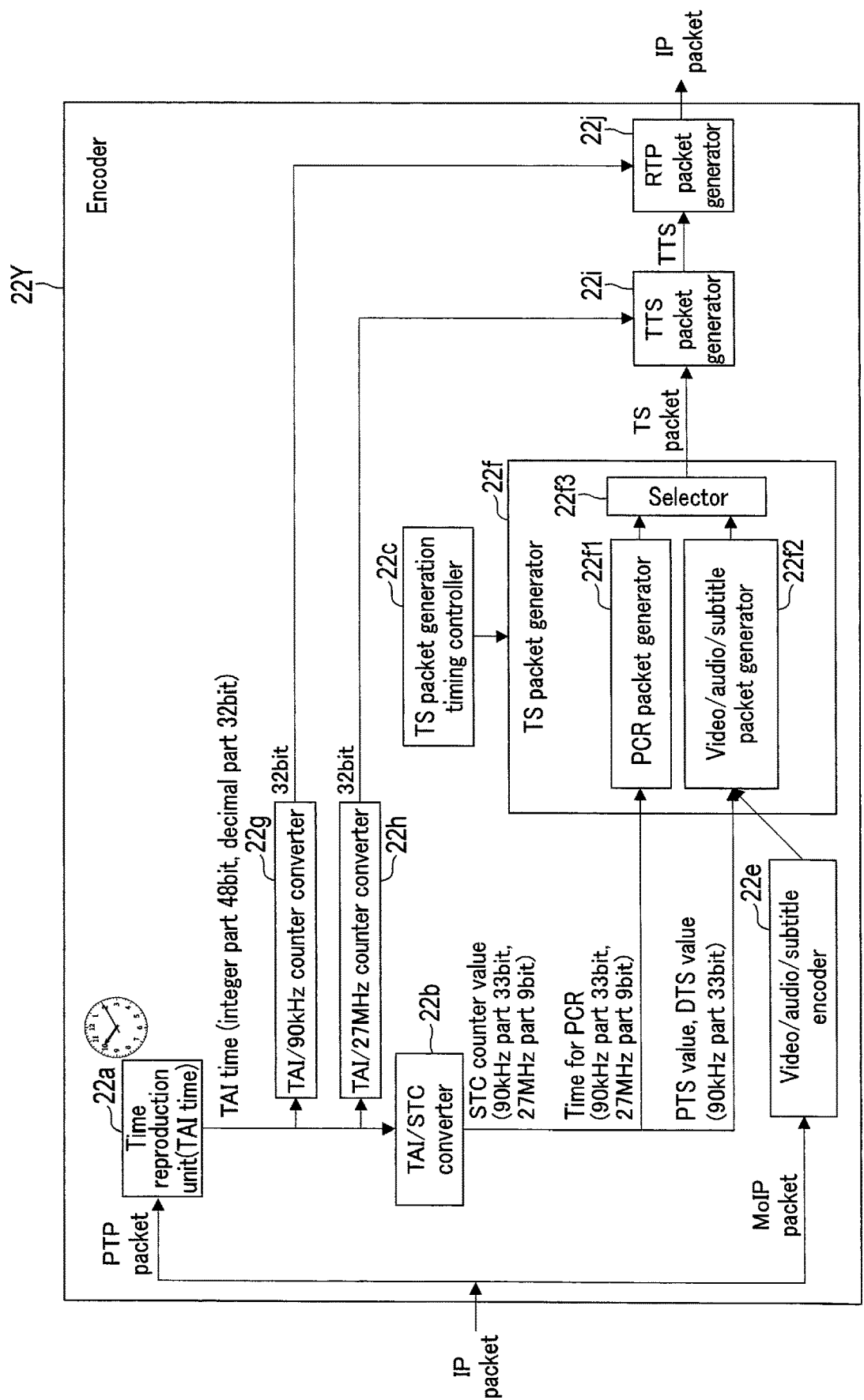
F I G. 3B

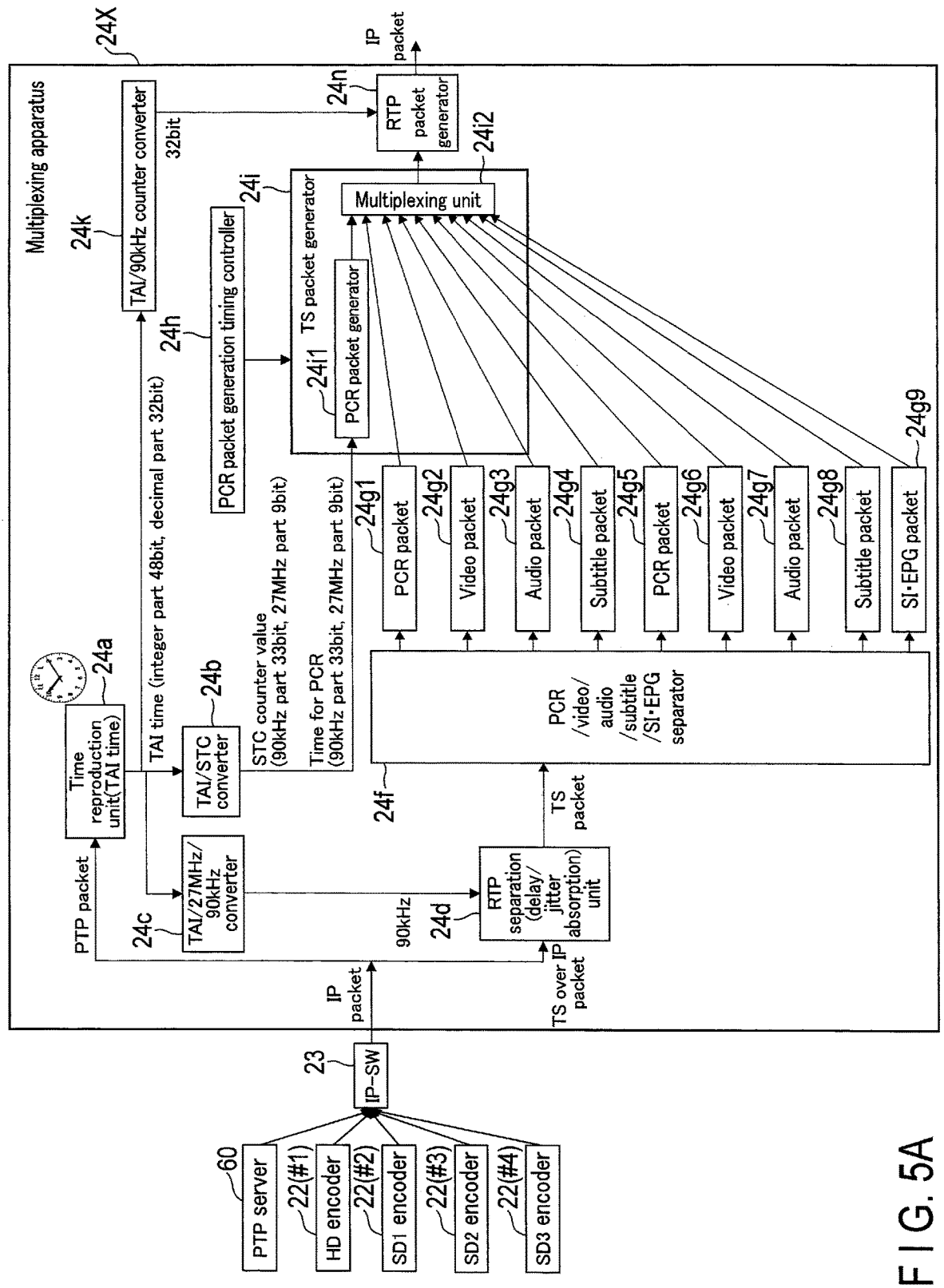
F I G. 5A

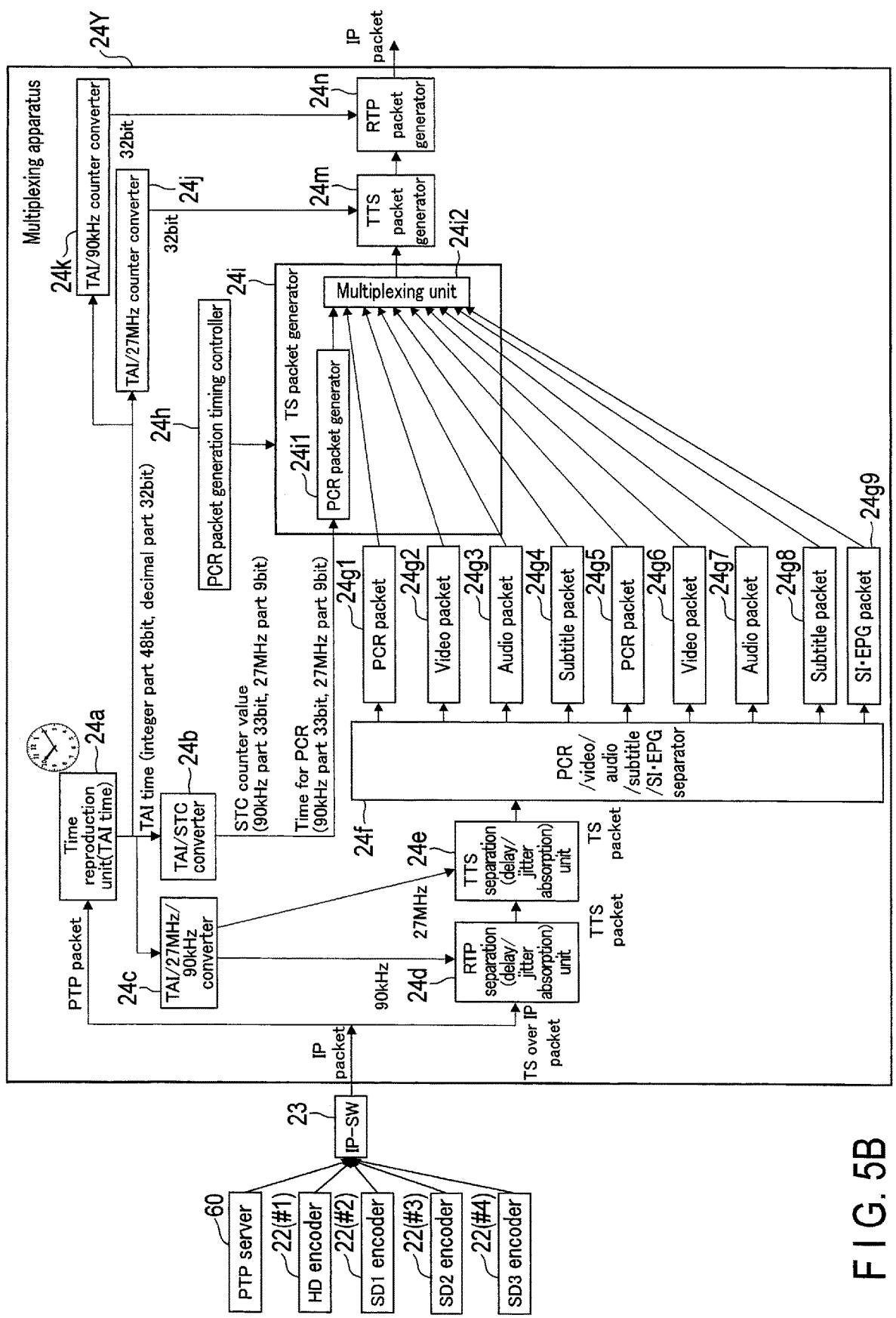
F I G. 5B

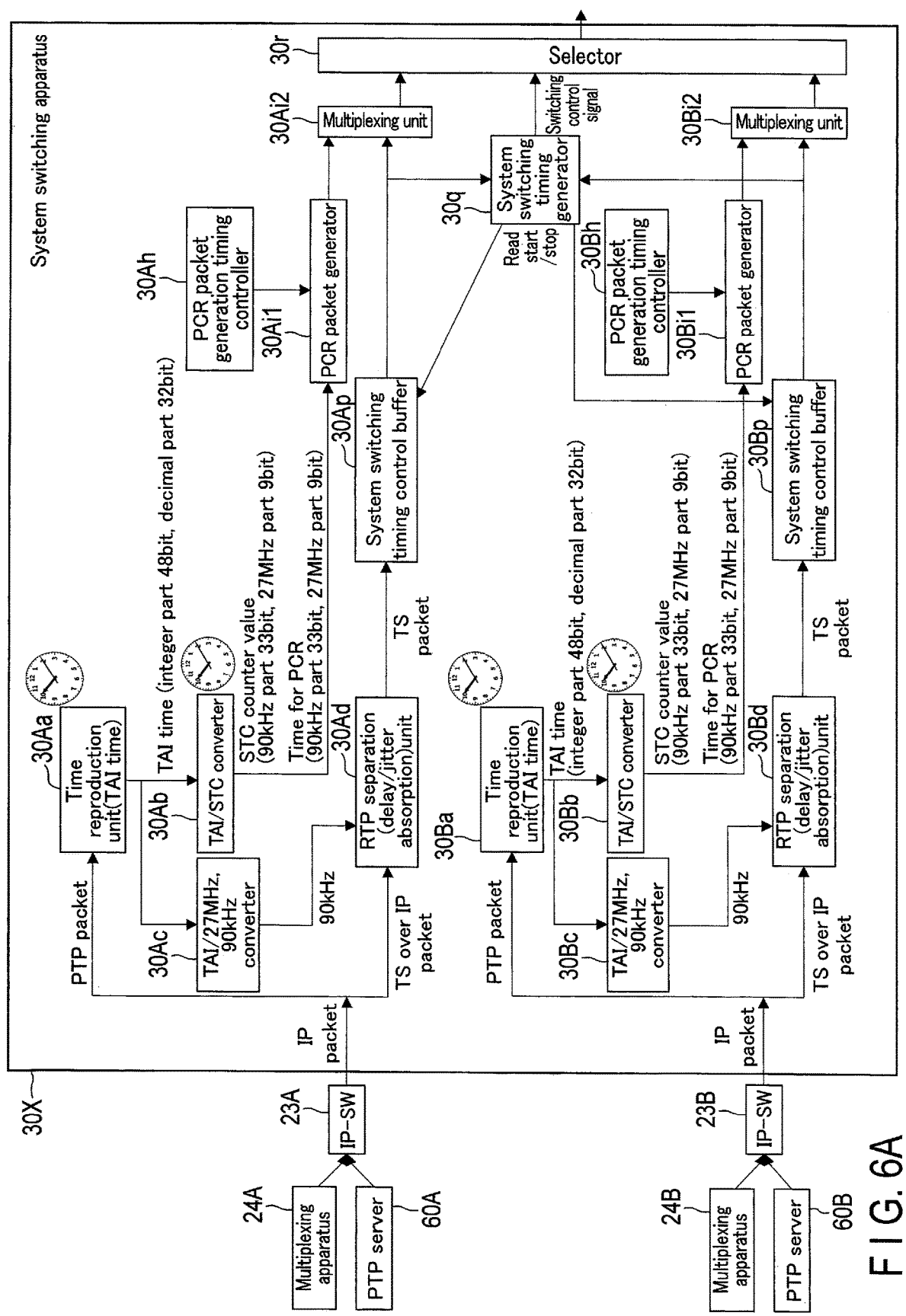
F I G. 6A

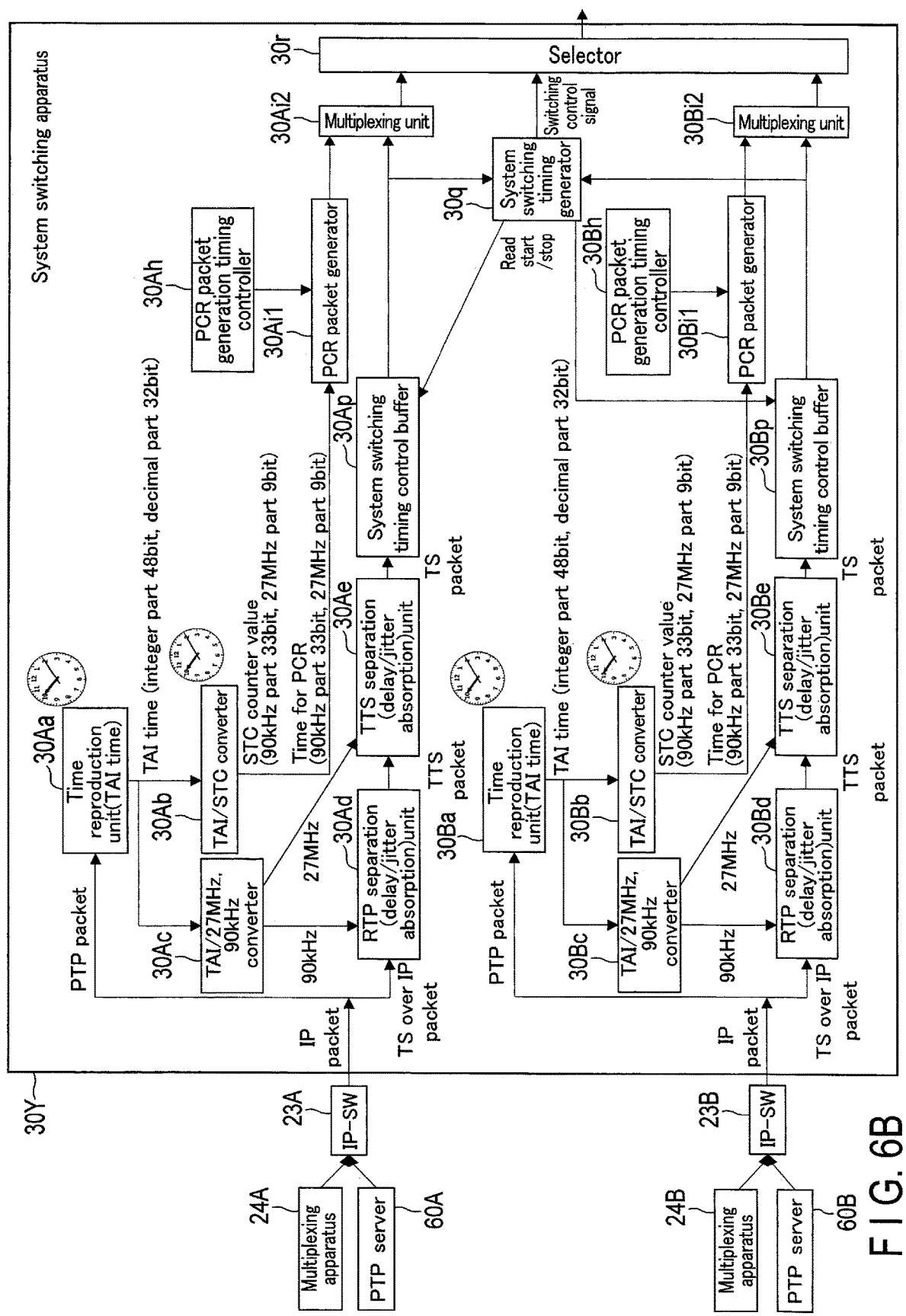
F I G. 6B

| Data structure | Bit | Identifier |
|---|---|---|
| TimeStampedTS() {<br>  Do{<br>    Timestamp<br>    transport_packet()<br>  } while(! end_of_file)<br>} | 32 | uimsbf |

F I G. 12

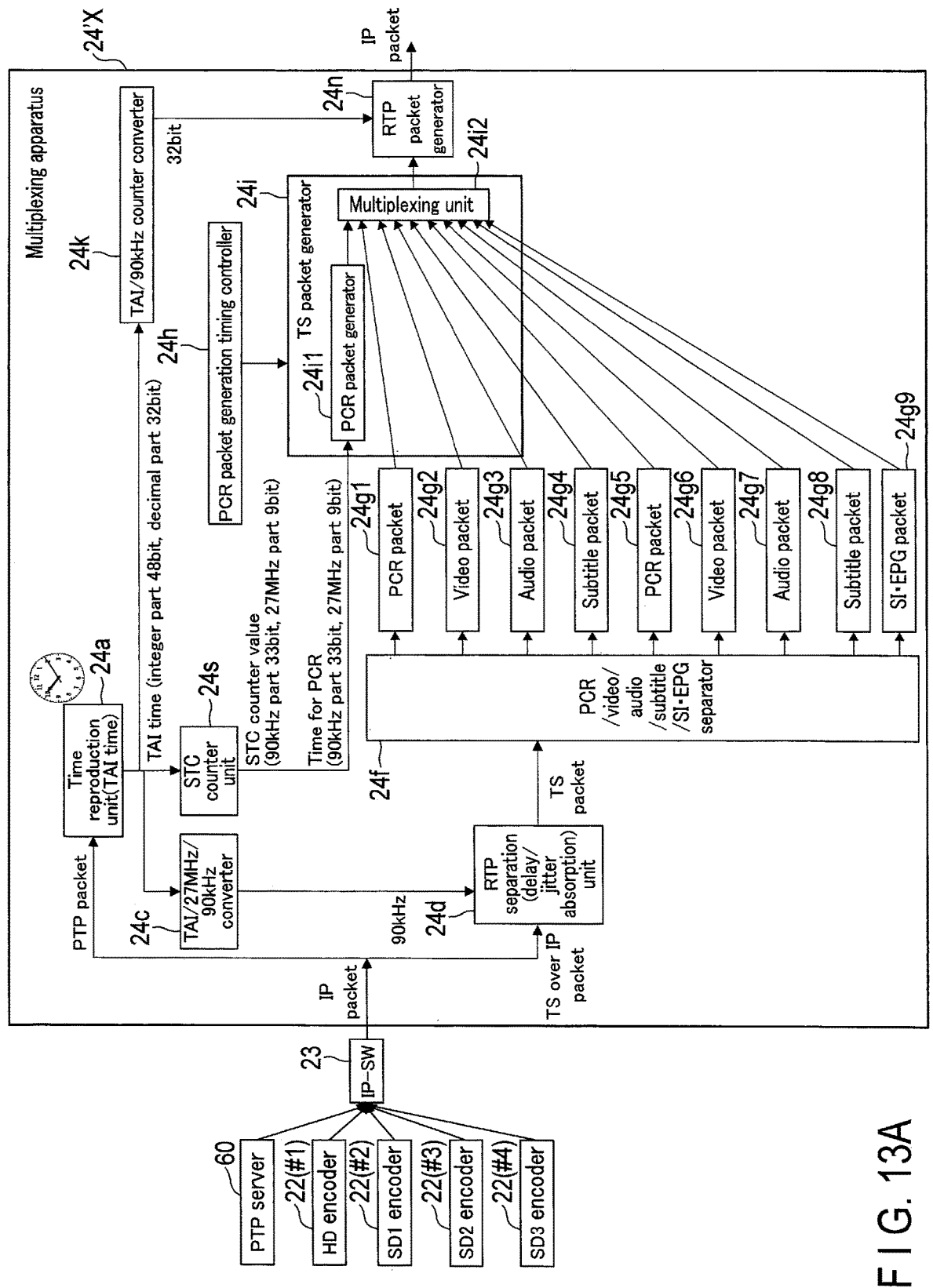
F I G. 13A

BROADCASTING SYSTEM, ENCODER, MULTIPLEXING APPARATUS, MULTIPLEXING METHOD, SYSTEM SWITCHING APPARATUS, AND SYNCHRONIZATION CONTROL APPARATUS

CROSS-REFERENCE TO RELATED APPLICATION

This application is based upon and claims the benefit of priority from Japanese Patent Application No. 2018-246850, filed Dec. 28, 2018, the entire contents of which are incorporated herein by reference.

FIELD

Embodiments described herein relate generally to a broadcasting system for ground digital broadcasting, satellite broadcasting, CATV, IP retransmission system, and the like, an encoder, a multiplexing apparatus, a multiplexing method and a system switching apparatus which are applied to the broadcasting system, and a synchronization control apparatus which is applied to the encoder and the multiplexing apparatus.

BACKGROUND

At present, in a broadcast system (including a distribution system) for ground digital broadcasting, satellite broadcasting, CATV, IP retransmission system and the like, a redundant system including a working system and an auxiliary system is constructed on the assumption of an apparatus fault, apparatus maintenance during broadcasting, and the like.

In this kind of broadcasting system configured to be redundant, in order to execute seamless system switching between the working system and auxiliary system, it is imperative to synchronize STC (System Time Clock) counter values of TS (Transport Stream) (T-STD model) between the systems.

In order to synchronize STC counter values, STC counter values are first sampled, and are input as PCR (Program Clock Reference) to each device (e.g. encoder, multiplexing apparatus) in PCR packet format of TS. Thereby, the STC counter values in the respective devices are synchronized.

In recent years, as regards broadcasting systems, the standardization of a video/audio transmission method using IP packets (Ethernet (trademark)), which is called "Media over IP" (hereinafter abbreviated as "MoIP"), has been in progress. In connection with this, in the SMPTE, in addition to the transmission of video/audio/auxiliary information (SMPTE ST 2022-2, SMPTE ST 2110-10), the generation (SMPTE ST 2059-1) of synchronization signals using PTP (Picture Transfer Protocol) that is time information has also been standardized.

However, PCR packets are distributed to each device by a DVB-ASI interface which is generally a coaxial cable. On the other hand, although TS packets including PCR packets can be constructed by IP-based implementation by SMPTE ST 2022-2 and can be transmitted, the transmission is one-way transmission from a sending side to a receiving side, and it is difficult to synchronize STC counter values in each device in such an environment that a delay differs between transmission paths, or jitter occurs, as in an IP network.

In this manner, it is not possible to adapt to IP-based implementation by the method of synchronizing STC counter values in each of devices (encoders, multiplexing apparatuses, etc.) of the working system and auxiliary system by using PCR packets.

In addition, conventionally, in many cases, in this kind of broadcasting system, the working system and auxiliary system are installed in the same broadcasting station facility. However, for example, when the broadcasting station facility is damaged by a disaster such as an earthquake, there is concern that the broadcasting function is completely lost. From the standpoint of diversification of risk, it is not preferable to install both the working system and the auxiliary system at the same location.

It is thus preferable that the working system and auxiliary system are installed at places which are as remote as possible from each other. Similarly, it is also preferable that the devices, such as encoders and multiplexing apparatuses, which constitute the working system and auxiliary system, are distributedly installed at mutually remote places, since the above risk can be diversified.

However, in the case where the working system and auxiliary system are installed at mutually remote places, a transmission delay occurs between the working system and auxiliary system when a TS (over IP) is received and TS packets are transmitted to a system switching apparatus.

Besides, in the case where the working system and auxiliary system are constituted by encoders and multiplexing apparatuses which are installed at mutually remote places, a transmission delay also occurs between the working system and auxiliary system when, in each of the working system and auxiliary system, the multiplexing apparatus receives a TS (over IP) from each of the encoders and transmits TS packets to the system switching apparatus.

Accordingly, in order to realize a broadcasting system which can perform seamless inter-system switching between the working system and auxiliary system while adapting to IP-based implementation, it is necessary not only to synchronize STC counter values of the encoders and multiplexing apparatus, but also to compensate for the above-described transmission delay, in each of the working system and auxiliary system.

International Patent Application WO2017/026248 discloses a method of synchronizing clocks for operating STC counters, from time information reproduced from PTP.

However, in the conventional method disclosed in International Patent Application WO2017/026248, the clocks for operating STC counters are synchronized, and STC counter values in each device, which are necessary for redundancy switching of TS cannot be synchronized.

Furthermore, International Patent Application WO2017/026248 does not disclose a technology for compensating for the above-described transmission delay.

BRIEF DESCRIPTION OF THE DRAWINGS

FIG. 1 is a configuration view illustrating an example of a broadcasting system of a first embodiment;

FIG. 2 is a configuration view illustrating another example of the broadcasting system of the first embodiment;

FIG. 3A is a functional block diagram illustrating a configuration example of an encoder which is applied to the broadcasting system of the first embodiment (a case of handling a TS packet);

FIG. 3B is a functional block diagram illustrating another configuration example of the encoder which is applied to the broadcasting system of the first embodiment (a case of handling a TTS (Timestamped Transport Stream) packet);

FIG. 5A is a functional block diagram illustrating a configuration example of a multiplexing apparatus which is applied to the broadcasting system of the first embodiment (a case of handling a TS packet);

FIG. 5B is a functional block diagram illustrating another configuration example of the multiplexing apparatus which is applied to the broadcasting system of the first embodiment (a case of handling a TTS packet);

FIG. 6A is a functional block diagram illustrating a configuration example of a system switching apparatus which is applied to the broadcasting system of the first embodiment (a case of handling a TS packet);

FIG. 6B is a functional block diagram illustrating another configuration example of the system switching apparatus which is applied to the broadcasting system of the first embodiment (a case of handling a TTS packet);

FIG. 12 is a configuration view of TTS data defined by IPTVFJ STD-0009;

FIG. 13A is a functional block diagram illustrating a configuration example of a multiplexing apparatus which is applied to the broadcasting system of the second embodiment (a case of handling a TS packet)

DETAILED DESCRIPTION

Figure 4A:
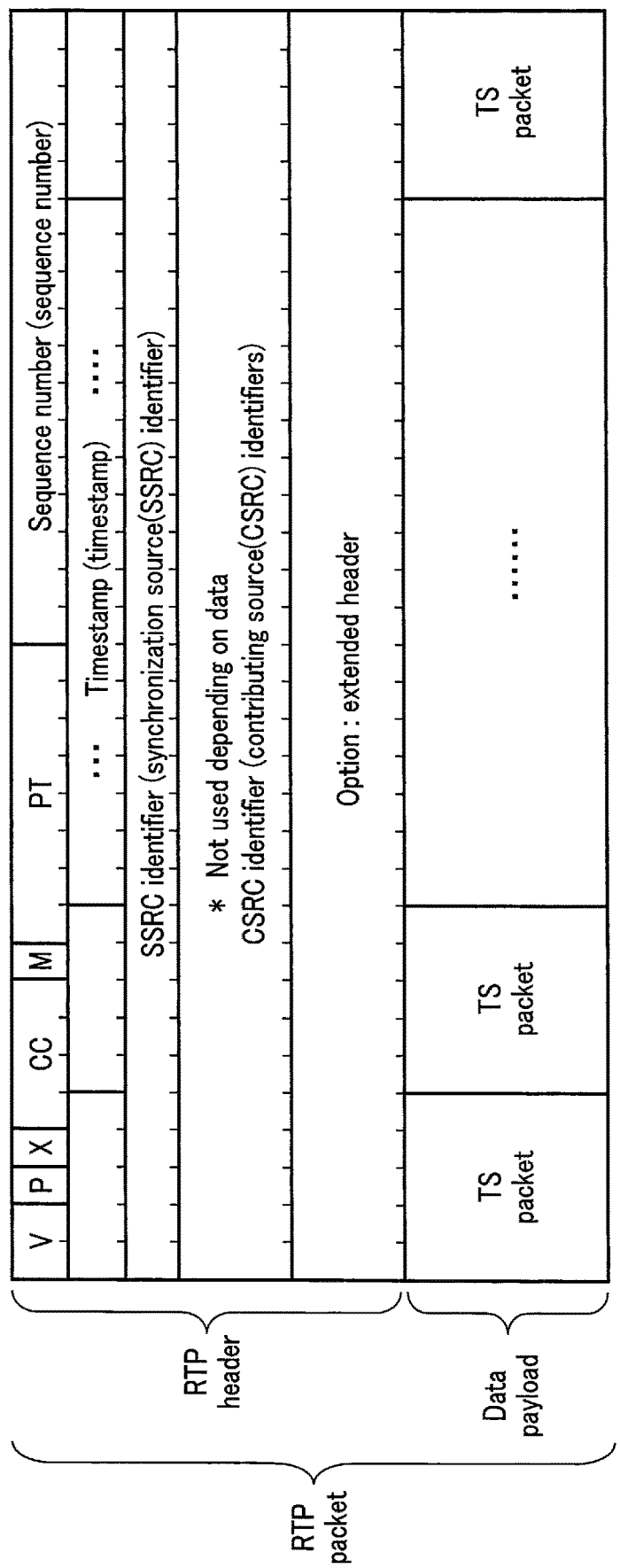
FIG. 4A is a configuration view of an RTP header defined by RFC 3550 (a case of handling a TS packet)

Hereinafter, embodiments of the present invention will be described with reference to the accompanying drawings.

According to an embodiment, an encoder includes a time reproduction unit, a first converter, a first TS (Transport Stream) packet generator, a second TS packet generator, a selector, a counter unit, and an RTP (Real-Time Transport Protocol) packet generator. The time reproduction unit is configured to communicate a PTP (Precision Time Protocol) packet and to reproduce TAI (International Atomic Time) time from the PTP packet. The first converter is configured to determine a time length in which an STC (System Time Clock) counter value laps, to calculate a remainder of the time length relative to the TAI time, and to generate a time for PCR (Program Clock Reference) and a PTS (Presentation Time Stamp) value, based on the remainder. The first TS packet generator is configured to generate a PCR packet, and to add the time for PCR to the PCR packet, thereby generating a first TS packet. The second TS packet generator is configured to receive a video content packet, and to add the PTS value to the video content packet, thereby generating a second TS packet. The selector is configured to select one of the first TS packet and the second TS packet. The counter unit is configured to operate at a first frequency, and to count the TAI time reproduced by the time reproduction unit by using a counter which counts zero once again when the TAI time advances to a predetermined bit, thereby outputting an ultimately acquired value as a counter value for an RTP header. The RTP packet generator is configured to add the counter value for the RTP header to the TS packet selected by the selector, thereby generating an RTP packet.

First Embodiment

A broadcasting system of a first embodiment will be described.

FIG. 1 is a configuration view illustrating an example of the broadcasting system of the first embodiment.

A broadcasting system 1 of the present embodiment is a broadcasting system (including a distribution system) for ground digital broadcasting, satellite broadcasting, CATV, IP retransmission system, and the like.

The broadcasting system 1 includes a compression multiplex system control apparatus 10 and a PTP server 60.

The compression multiplex system control apparatus 10 compression-encodes video/audio, generates broadcast TS signals according to a predetermined broadcast method such as a ground digital broadcast method, and outputs the broadcast TS signals to transmission equipment such as an STL transmission apparatus/OFDM modulator.

The compression multiplex system control apparatus 10 includes a working system 20A and an auxiliary system 20B, which have the same configuration, for the purpose of redundancy. Each of the working system 20A and auxiliary system 20B includes a plurality of encoders 22(#1) to 22(#4), a multiplexing apparatus 24, and a scrambler 25. The working system 20A and auxiliary system 20B can be disposed at physically remote places, such as in a virtual environment on a cloud computing system.

In order to execute seamless inter-system switching between the working system 20A and auxiliary system 20B, it is necessary to synchronize STC counter values between the encoders 22(#1) to 22(#4) and multiplexing apparatuses 24 in both systems 20A and 20B. Thus, a synchronization control function is assembled in the encoders 22(#1) to 22(#4) and multiplexing apparatuses 24 in both systems 20A and 20B, and synchronization control is executed in the encoders 22(#1) to 22(#4) and multiplexing apparatuses 24 in both systems 20A and 20B.

The compression multiplex system control apparatus 10 further includes a system switching apparatus 30 which is provided common to the working system 20A and auxiliary system 20B.

The compression multiplex system control apparatus 10 further includes a PTP distribution apparatus 40 which distributes PTP packets, which are delivered from a PTP server 60 provided outside the compression multiplex system control apparatus 10, to the encoders 22(#1) to 22(#4), multiplexing apparatuses 24 and system switching apparatus 30.

Moreover, the compression multiplex system control apparatus 10 includes a frame synchronization signal generation apparatus 50 which generates ISDB-T (Integrated Services Digital Broadcasting-Terrestrial) frame synchronization signals, and outputs the generated ISDB-T frame synchronization signals to each multiplexing apparatus 24. Although ISDB-T is described here by way of example, the frame synchronization signal generation apparatus 50 is also applicable to other broadcasting methods using TS, such as ISDB-S, ATSC (Advanced Television Systems Committee standards) and DVB (Digital Video Broadcasting) methods.

Each of the encoder 22(#1) (HD encoder), encoder 22(#2) (SD1 encoder), encoder 22(#3) (SD2 encoder) and encoder 22(#4) (SD3 encoder) compression-encodes video/audio, executes TS or TS over IP implementation of the compression-encoded video/audio by using PTP packets distributed from the PTP distribution apparatus 40, and outputs the resultant to the multiplexing apparatus 24. The video/audio can be formed as MoIP packets.

The encoders 22(#1), 22(#2), 22(#3) and 22(#4) can be disposed at physically remote places, such as in a virtual environment on a cloud computing system.

The video signals and PTP packets can be input to each of the encoders 22(#1), 22(#2), 22(#3) and 22(#4) by an Ethernet cable. Although FIG. 1 illustrates four encoders 22(#1), 22(#2), 22(#3) and 22(#4) by way of example, the number of encoders 22 is not limited to four, and may be three or less, or five or more.

The multiplexing apparatus 24 multiplexes the video/audio, which is compression-encoded by each of the encoders 22(#1), 22(#2), 22(#3) and 22(#4), into a broadcast TS signal having an ISDB-T frame structure, by using the PTP packets output from the PTP distribution apparatus 40 and the ISDB-T frames output from the frame synchronization signal generation apparatus 50, and outputs the broadcast TS signal to the scrambler 25. The multiplexing apparatus 24 can be installed at a place which is physically remote from the encoders 22(#1), 22(#2), 22(#3) and 22(#4) and the scrambler 25.

The scrambler 25 executes a scramble process on the broadcast TS signal which is output from the multiplexing apparatus 24, and outputs the scramble-processed broadcast TS signal to the system switching apparatus 30. The scrambler 25 can be installed at a place which is physically remote from the encoders 22(#1), 22(#2), 22(#3) and 22(#4) and the multiplexing apparatus 24, such as in a virtual environment on a cloud computing system.

The system switching apparatus 30 performs frame phase adjustment on the broadcast TS signal which is output from the scrambler 25, by using the PTP packets distributed from the PTP distribution apparatus 40, and outputs the frame-phase-adjusted broadcast TS signal to transmission equipment such as an STL transmission apparatus, OFDM modulator, or the like.

FIG. 2 is a configuration view illustrating another example of the broadcasting system of the first embodiment.

A broadcasting system 1' illustrated in FIG. 2 is a modification of the broadcasting system 1 illustrated in FIG. 1, and includes a compression multiplex system control apparatus 10' and a PTP server/distribution apparatus 70.

The compression multiplex system control apparatus 10' differs from the compression multiplex system control apparatus 10 in that the compression multiplex system control apparatus 10' does not include the PTP distribution apparatus 40.

The PTP server/distribution apparatus 70 is configured such that the PTP server 60 and distribution apparatus 40, which are illustrated in FIG. 1, are integrated.

The PTP server/distribution apparatus 70 communicates PTP packets to the encoders 22(#1), 22(#2), 22(#3) and 22(#4), multiplexing apparatuses 24 and system switching apparatus 30.

Since the other configuration of the broadcasting system 1' is the same as in FIG. 1, an overlapping description of identical parts is omitted by adding the same reference signs as in FIG. 1 to the identical parts.

Also in the broadcasting system 1' illustrated in FIG. 2, the working system 20A and auxiliary system 20B can be disposed at physically remote places. In each system 20, the encoders 22(#1), 22(#2), 22(#3) and 22(#4), multiplexing apparatus 24 and scrambler 25 can be installed at physically remote places, for example, as in a virtual environment on a cloud computing system.

FIG. 3A is a functional block diagram illustrating a configuration example of an encoder which is applied to the broadcasting system of the first embodiment.

FIG. 3A illustrates a detailed configuration in a case where the encoders 22(#1), 22(#2), 22(#3) and 22(#4) illustrated in FIG. 1 and FIG. 2 handle TS packets, without handling TTS packets. Since the encoders 22(#1), 22(#2), 22(#3) and 22(#4) have the same configuration, an encoder 22X, which represents these encoders, will be described below.

The encoder 22X includes a processor (not shown) and a program memory (not shown), and includes a time reproduction unit 22a, a TAI/STC converter 22b, a video/audio/subtitle encoder 22e, a TS packet generator 22f, a TAI/90 kHz counter converter 22g, and an RTP packet generator 22j. The TS packet generator 22f further includes a PCR packet generator 22f1, a video/audio/subtitle packet generator 22f2, and a selector 22f3. Besides, the encoder 22X may include, as an option, a TS packet generation timing controller 22c.

These functions are realized by causing the processor to execute programs stored in the program memory.

In the encoder 22X, a synchronization control apparatus is realized by the time reproduction unit 22a, TAI/STC converter 22b, TAI/90 kHz counter converter 22g, and RTP packet generator 22j.

As described above, video/audio and a PTP packet are communicated to the encoder 22X. The video/audio and PTP packet are included in an IP packet.

If this IP packet is received by the encoder 22X, the PTP packet included in the IP packet is received by the time reproduction unit 22a. In addition, video/audio, which is an MoIP packet included in the IP packet, is received by the video/audio/subtitle encoder 22e.

Upon receiving the PTP packet, the time reproduction unit 22a samples TAI time which is stamped on the PTP packet, and outputs the sampled TAI time to the TAI/STC converter 22b and TAI/90 kHz counter converter 22g.

The TAI time is a time based on Jan. 1, 1970 as the reference time. Specifically, by the same approach as SMPTE ST 2059-1, based on Jan. 1, 1970 as the reference time, the time reproduction unit 22a sets the STC counter value at this time to zero, and reproduces TAI time from the PTP packet.

The TAI time is expressed, for example, by 80 bits in total, which include 48 bits of an integral part and 32 bits of a decimal part. A 64-bit CPU, which is now widely used, cannot simply perform arithmetic operations which treat 80 bits.

In addition, in the TAI time, a decimal fraction (e.g. recurring decimal), which cannot exactly be expressed by a power of 2, is treated. Thus, unless a mapping method is made unique, an error occurs between different devices when the TAI time is converted to STC counter values. By rounding a decimal part of the TAI time by a predetermined rule (e.g. round-off to millisecond precision) before executing conversion, the TAI time can be treated in 64-bit operations.

However, with the millisecond precision, it is not possible to obtain 27 MHz precision (1 clock=about 37 nanoseconds) which is required for STC counter values, and a problem occurs depending on systems to be applied. Thus, the present embodiment shows a method of converting the TAI time to STC counter values with higher precision.

Specifically, as exemplarily illustrated below, the TAI/STC converter 22b of each encoder, 22(#1), 22(#2), 22(#3), 22(#4), repeats a process of narrowing the range of values which are treated in the range in which calculation by 64-bit operations is possible, so that an error occurs only in the last step.

In this process, a time length (e.g. $2^{33}/90,000$ seconds), in which the STC counter value laps, is determined, and a remainder of the time length (e.g. $2^{33}/90,000$ seconds) relative to the TAI time is calculated. Specifically, in order to calculate the remainder, a remainder of an integer or a finite decimal, which is obtained by multiplying the time length (e.g. $2^{33}/90,000$ seconds), in which the STC counter value laps, by an integer, is calculated. It should be noted, however, that when the remainder is calculated by the finite decimal, the TAI time and the finite decimal are multiplied by $10^n$ (n is a natural number), so that the finite decimal becomes an integer.

Next, the calculated remainder is converted to the STC counter value (e.g. a time for PCR composed of a base of 90 kHz and an extension of 27 kHz). Specifically, the STC counter value is determined as a time for PCR composed of a base of a first frequency (90 kHz) and an extension of a second frequency (28 MHz).

A concrete example of the above process is shown below.

Here, as regards the TAI time, an integer part is 48 bits (binary number), and a decimal part is 32 bits (0~999,999,999*$10^{-9}$), and is substantially 30 bits.

Integer part (48 bits)
1234 5678 9ABC (hexadecimal notation)
20,015,998,343,868 (decimal notation)

Decimal part (32 bits, substantially 30 bits since the decimal part is in the range of 0~0.999 999 999 (decimal notation))
1234 5678 (hexadecimal notation)
0.305 419 896 (decimal notation).

A description is further given by taking, as an example, 20,015,998,343,868.305 419 896 seconds in the decimal notation.

At this time point, the precision of 78 (=48+30) bits is necessary, and the precision is insufficient in 64-bit arithmetic operations.

Since $2^{33}$ clock@90 kHz=95443.7176888888 . . . seconds are an infinite decimal, this is multiplied by 5625 and rounded to an integer. Thereby, the infinite decimal becomes 95,443.7176888888 . . . ×5,625=536,870,912 seconds. Specifically, in 536,870,912 seconds, $2^{33}$ clock@90 kHz laps (circles) 5,625 times. Since counting starts once again from 0 after the lap, the necessary information is a remainder (modulo) after the lap.

Thereby, by finding the modulo of 536,870,912 seconds, a dynamic range of the integer part is reduced.

20,015,998,343,868%536,870,912=377,002,684 seconds.

Thereby, the integer part is reduced to a 29-bit width of 0~536,870,911 (0x1FFF FFFF), and the precision of 59 (=29+30) bits is obtained together with the decimal part. If the residual integer part and decimal part are added, 536,870,912.305 419 896 seconds are obtained (1).

At this stage, if the number of cycles at 27 MHz is calculated, 536,870,912.305 419 896/(1/27,000,000)=1.449 551 463 224 633e+16 is obtained. Specifically, the required precision of arithmetic operation is 64 bits.

In order to separate a 90 kHz part (base) and 27 MHz part (extension) of the STC counter value, a value (integer) obtained by division by 300 is calculated for the base, and the modulo of 300 is calculated for the extension.

base=(1.449551463224633×$10^{16}$)/300=48,318,382,107,487 extension=(1.449551463224633×$10^{16}$)%300=234.

If the base part is expressed by the hexadecimal notation, 0x2BF2 0000 6B5F. If a part exceeding 33 bits is discarded (wrapped), 0x0 0000 6B5F (27,487 in decimal notation) is obtained. This is (Result 1).

Note that a general expression of a floating fraction is 52 bits for a mantissa part, 11 bits for an exponent part, and 1 bit for a sign, and thus a round-off error occurs in treating an integer of 64-bit precision at a time of performing a floating-point arithmetic operation.

Next, a case is described in which the dynamic range is further reduced before finding the number of cycles at 27 MHz.

If the above-described (1) is expressed by nanoseconds, 536,870,912,305,419,896 nanoseconds are obtained. If 95443.7176888888 . . . seconds are multiplied by 9, then 858,993.4592 seconds, i.e. 858,993,459,200,000 nanoseconds, are obtained. When nanosecond is considered as the unit, the lower five digits of the divisor of the modulo operation are 0. Accordingly, the modulo operation is performed by using 100,000 nanoseconds as the unit, and the dynamic range is further reduced. Thereby, since the range of 0~95443.7176888888 is obtained, the precision becomes 47 (=17+30) bits.

536, 870, 912, 305, 4% 858, 993, 459, 2

(commas for division of digits are intentionally placed at positions of the nanosecond notation)

= 5, 368, 709, 123, 054% 8, 589, 934, 592

= 3, 054

= 305, 4(100,000 nanoseconds).

If the above-described modulo and the lower five digits, which were ignored at the time of calculating the modulo, are combined, 305,419,896 nanoseconds are obtained. The upper six digits are 305,419 microseconds. Since the STC counter value is counted at 27 MHz (27 cycles are counted per 1 microsecond), the count value becomes 8,246,313 cycles.

On the other hand, since the lower three digits are 0.896 microseconds, 0.896×27=24.192 cycles. By round-off, 24 cycles are obtained. By adding this to the above, 8,246,337 cycles@27 MHz are obtained.

In order to separate a 90 kHz part (base) and 27 MHz part (extension) of the STC counter value, a value (integer) obtained by division by 300 is calculated for the base, and the modulo of 300 is calculated for the extension.

base=8,246,337/300=27,487
extension=8,246,337 300=237.

Here, if the base is a value exceeding $2^{33}$, the lower 33 bits expressed by binary numbers are set as the base, and the wrap process is not necessary in the above arithmetic operation result. This is (Result 2).

If (Result 1) and (Result 2) are compared, there is an error of 3 clocks in the 27 MHz precision, as described below.

(Result 1) 27,487 (base), 234 (extension)
(Result 2) 27,487 (base), 237 (extension).

Since the decoding/presentation timing (DTS value, PTS value) of video/audio may be controlled with the precision of 90 kHz, it can be thought, from the above results, that no problem arises no matter which of the method of (Result 1) and the method of (Result 2) is used.

However, the precision of 27 MHz is expected for the system clock (STC counter value (time for PCR)). Accordingly, when a certain system is constructed, it is desirable to make uniform the arithmetic operation method (precision) in all associated devices. If consideration is given to the difficulty in making uniform the arithmetic operation precision between devices, there is a case in which the method of (Result 2) is preferable to the method of (Result 1).

In particular, in the case of the method of (Result 1), it is necessary to make uniform not only the procedures, but also the floating-point arithmetic operation parts. If consideration is given to a system which is constructed in various venders and platforms, the method of (Result 1) should be avoided.

The TAI/STC converter 22b outputs the time for PCR, which is calculated as described above, to the PCR packet generator 22f1, and outputs the PTS value and DTS value to the video/audio/subtitle packet generator 22f2.

On the other hand, the video/audio/subtitle encoder 22e separates video/audio/subtitle data from the MoIP packets, and outputs the separated video/audio/subtitle data to the video/audio/subtitle packet generator 22f2.

The PCR packet generator 22f1 generates a PCR packet. When the TS packet generation timing controller 22c is provided, the PCR packet generator 22f1 generates a PCR packet in accordance with the control by the TS packet generation timing controller 22c. Thereafter, the PCR packet generator 22f1 adds the time for PCR, which is output from the TAI/STC converter 22b, to the generated PCR packet, and outputs the PCR packet to the selector 22f3.

The video/audio/subtitle packet generator 22f2 generates a video/audio/subtitle packet from the video/audio/subtitle data which is output from the video/audio/subtitle encoder 22e. When the TS packet generation timing controller 22c is provided, the video/audio/subtitle packet generator 22f2 generates the video/audio/subtitle packet in accordance with the control by the TS packet generation timing controller 22c. Thereafter, the video/audio/subtitle packet generator 22f2 adds the PTS value and, when necessary, the DTS value, which are output from the TAI/STC converter 22b, to the generated video/audio/subtitle packet, and outputs the video/audio/subtitle packet to the selector 22f3.

The selector 22f3 selects either the PCR packet output from the PCR packet generator 22f1, or the video/audio/subtitle packet output from the video/audio/subtitle packet generator 22f2 (the video packet, audio packet and subtitle packet are also referred to as "content packet" as a generic term), and outputs the selected packet as a TS packet.

The TAI/90 kHz counter converter 22g includes a counter of a power of 2, which operates at 90 kHz and sets the TAI time that is output from the time reproduction unit 22a to zero once again when the TAI time advances to 0-0xFFFFFFFF in 32 bits, i.e. in the hexadecimal notation. Further, this counter outputs 32 bits, which are obtained ultimately, to the RTP packet generator 22j as a counter value for an RTP header.

The RTP packet generator 22j adds the counter value for RTP header, which is output from the TAI/90 kHz counter converter 22g, to the TS packet which is output from the selector 22f3. Thereby, the counter value for RTP header is written as a sending time in a "timestamp" field in an RTP header structure diagram defined by RFC 3550 as illustrated in FIG. 4A, and the TS packet is written in a "data payload" field.

FIG. 4A is a configuration view of an RTP header defined by RFC 3550 in a case of handling a TS packet.

The RTP packet generator 22j outputs, as illustrated in FIG. 4A, a UDP/IP packet in which the TS packet and the sending time thereof are written.

FIG. 3B is a functional block diagram illustrating another configuration example of the encoder which is applied to the broadcasting system of the first embodiment.

FIG. 3B illustrates a detailed configuration in a case where the encoders 22(#1), 22(#2), 22(#3) and 22(#4) illustrated in FIG. 1 and FIG. 2 handle TTS packets. Since the encoders 22(#1), 22(#2), 22(#3) and 22(#4) have the same configuration, an encoder 22Y, which represents these encoders, will be described below.

The configuration of the encoder 22Y is similar to the configuration of the encoder 22X. Thus, in FIG. 3B, parts identical to those in FIG. 3A are denoted by the same reference signs, and an overlapping description is avoided. Different points from the encoder 22X will be described.

The encoder 22Y is configured such that a TAI/27 MHz counter converter 22h and a TTS packet generator 22i are added to the encoder 22X.

The TAI/27 MHz counter converter 22h is provided between the time reproduction unit 22a and TAI/STC converter 22b, in parallel with the TAI/90 kHz counter converter 22g. The TAI/27 MHz counter converter 22h includes a counter of a power of 2, which operates at 27 MHz and sets the TAI time that is output from the time reproduction unit 22a to zero once again when the TAI time advances to 0-0xFFFFFFFF in 32 bits, i.e. in the hexadecimal notation. Further, this counter outputs 32 bits, which are obtained ultimately, to the TTS packet generator 22i as a counter value for a TTS header.

The TTS packet generator 22i is provided between the selector 22f3 and RTP packet generator 22j. The TTS packet generator 22i adds the 32-bit counter value for TTS header, which is output from the TAI/27 MHz counter converter 22h, to the TS packet which is output from the selector 22f3. Thereby, the TTS packet generator 22i generates a TTS packet of a timestamp-added TS (TTS: Timestamped TS) format, and outputs the TTS packet to the RTP packet generator 22j. Note that the counter value for TTS header, which is output from the TAI/27 MHz counter converter 22*h*, represents a time of sending this TS.

Figure 4B:
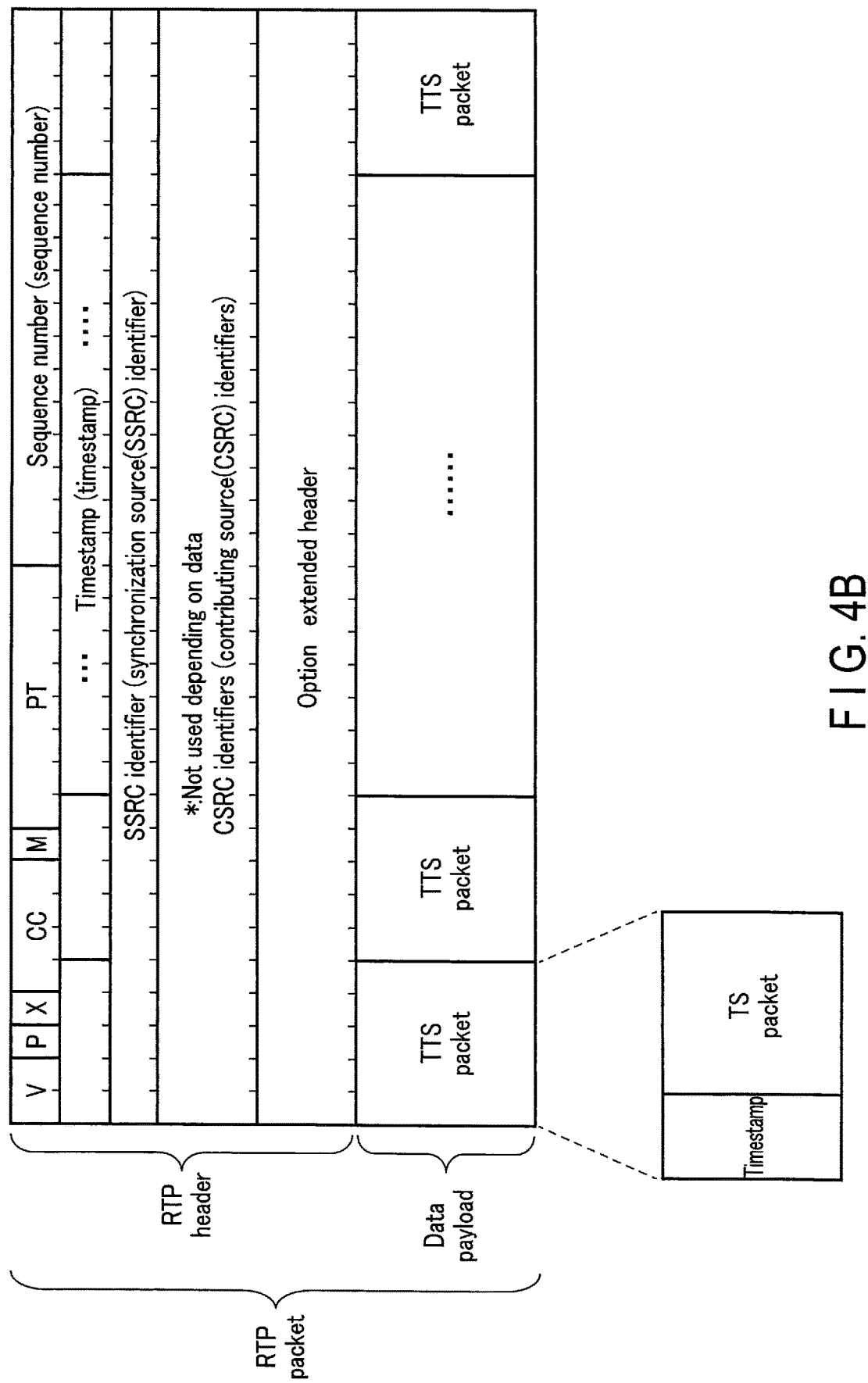
FIG. 4B is another configuration view of the RTP header defined by RFC 3550 (a case of handling a TTS packet)

The RTP packet generator 22*j* adds the counter value for RTP header, which is output from the TAI/90 kHz counter converter 22*g*, to the TTS packet which is output from the TTS packet generator 22*i*. Thereby, the counter value for RTP header is written as a sending time in a "timestamp" field in an RTP header structure diagram defined by RFC 3550 as illustrated in FIG. 4B, and the TTS packet is written in a "data payload" field. The TTS packet is configured such that a timestamp and a TS packet are combined.

Note that when SMPTE ST 2110-10 is applied, it is also possible to write, instead of the counter value for RTP header, for example, a time based on a PTP packet acquired from a GPS, in the timestamp field in FIG. 4A and FIG. 4B.

FIG. 5A is a functional block diagram illustrating a configuration example of a multiplexing apparatus which is applied to the broadcasting system of the first embodiment.

As regards a multiplexing apparatus 24X illustrated in FIG. 5A, FIG. 5A illustrates a detailed configuration of the multiplexing apparatus 24X in a case where the multiplexing apparatus 24 illustrated in FIG. 1 and FIG. 2 handles TS packets, without handling TTS packets.

The multiplexing apparatus 24X includes a processor (not shown) and a program memory (not shown), and includes a time reproduction unit 24*a*, a TAI/STC converter 24*b*, a TAI/27 MHz/90 kHz converter 24*c*, an RTP separation (delay/jitter/absorption) unit 24*d*, a PCR/video/audio/subtitle/SI•EPG separation unit 24*f*, a TS packet generator 24*i*, a TAI/90 kHz counter converter 24*k*, and an RTP packet generator 24*n*. Besides, the multiplexing apparatus 24X may include, as an option, a PCR packet generation timing controller 24*h*.

The TS packet generator 24*i* further includes a PCR packet generator 24*i*1 and a multiplexing unit 24*i*2.

These control functions are realized by causing the processor to execute programs stored in the program memory.

In the multiplexing apparatus 24X, a synchronization control apparatus is realized by the time reproduction unit 24*a*, TAI/STC converter 24*b*, TAI/27 MHz/90 kHz converter 24*c*, RTP separation (delay/jitter absorption) unit 24*d*, TAI/90 kHz counter converter 24*k*, and RTP packet generator 24*n*.

IP packets from the PTP server 60 and encoders 22 are input to the multiplexing apparatus 24X via an IP-SW 23 which is not illustrated in FIG. 1 or FIG. 2. Note that the multiplexing apparatus 24X handles TS packets without handling TTS packets, and thus each encoder 22 corresponds to the encoder 22X illustrated in FIG. 3A.

In signals from the PTP server 60 and encoders 22, jitter occurs since a delay or fluctuation occurs in the IP-SW 23. The IP packets are not limited to IP packets which are output from the PTP server 60 and encoders 22, and may include IP parts which are output from an SI•EPG encoder (not shown).

The time reproduction unit 24*a* has the same configuration as the time reproduction unit 22*a*. The time reproduction unit 24*a* communicates the PTP packet included in the input IP packet, samples TAI time that is stamped on the PTP packet, and outputs the sampled TAI time to the TAI/STC converter 24*b*, TAI/27 MHz/90 kHz converter 24*c*, and TAI/90 kHz counter converter 24*k*.

The TAI/STC converter 24*b* has the same configuration as the TAI/STC converter 22*b*. The TAI/STC converter 24*b* converts the TAI time, which is output from the time reproduction unit 24*a*, to time for PCR which is used for synchronization control between the systems.

The calculation procedure of the time for PCR in the TAI/STC converter 24*b* is the same as the calculation procedure in the TAI/STC converter 22*b*, so an overlapping description is avoided.

The TAI/STC converter 24*b* outputs the calculated time for PCR to the PCR packet generator 24*i*1.

The TAI/27 MHz/90 kHz converter 24*c* converts the TAI time, which is output from the time reproduction unit 24*a*, to time with precision of 90 kHz, and outputs the time with the precision of 90 kHz to the RTP separation (delay/jitter absorption) unit 24*d*.

Based on the time with the precision of 90 kHz which is output from the TAI/27 MHz/90 kHz converter 24*c*, the RTP separation (delay/jitter absorption) unit 24*d* performs correction of a delay and jitter for a TS over IP packet included in the IP packet which is output from the IP-SW 23, by using timestamp information which is stamped on an RTP packet including a plurality of TS packets in the IP packet. Then, the RTP separation (delay/jitter absorption) unit 24*d* separates the TS packets from the RTP packet, and outputs the separated TS packets to the PCR/video/audio/subtitle/SI•EPG separation unit 24*f*. Thereby, the RTP separation (delay/jitter absorption) unit 24*d* absorbs a delay and jitter in the RTP.

Since the method of absorbing a delay and jitter by the RTP separation (delay/jitter absorption) unit 24*d* in this manner is publicly known by RFC 3550 and IPTVFJ STD-0009, only a brief description will be given below.

Specifically, in the multiplexing apparatus 24X, when the time reproduction unit 24*a* samples TAI time that is stamped on the PTP packet, if a delay is zero, the time of the reception of the PTP packet corresponds to the sampled TAI time. However, actually, the delay is not zero. Thus, the time of the reception of the PTP packet is necessarily later than the TAI time that is stamped on the PTP packet.

The jitter in the RTP separation (delay/jitter absorption) unit 24*d* is determined by a transmission path. Accordingly, for example, if it is assumed that jitter of one second is absorbed, a packet arrives in a range of zero second to one second, according to the law of cause and effect. For example, in the case of this time, it is assumed that a packet is read in the RTP separation (delay/jitter absorption) unit 24*d* when one second plus the time stamped on the header has come. In this case, as regards a packet which has arrived at zero second, it is necessary to wait for one second. On the other hand, as regards a packet which has arrived with a delay of one second, this packet is read instantaneously at zero second. Thereby, the delay from an instant of the output from the RTP separation (delay/jitter absorption) unit 24*d* is always fixed to one second.

In this manner, the RTP separation (delay/jitter absorption) unit 24*d* absorbs jitter. Since the delay cannot be absorbed retrospectively, the jitter can be regarded, in a sense, as absorbing the delay.

The PCR/video/audio/subtitle/SI•EPG separation unit 24*f* separates, from the input TS packets, respective kinds of packets, such as a PCR packet 24*g*1, a video packet 24*g*2, an audio packet 24*g*3, a subtitle packet 24*g*4, a PCR packet 24*g*5, a video packet 24*g*6, an audio packet 24*g*7, a subtitle packet 24*g*8, and an SI•EPG packet 24*g*9, and outputs the separated packets to the multiplexing unit 24*i*2.

The PCR packet generator 24*i*1 generates a PCR packet. Besides, when the PCR packet generation timing controller 24*h* is provided, the PCR packet generator 24*i*1 generates a PCR packet in accordance with the control by the PCR packet generation timing controller 24*h*. In addition, the PCR packet generator 24*i*1 adds the time for PCR, which is output from the TAI/STC converter 24*b*, to the generated PCR packet, and outputs the PCR packet to the multiplexing unit 24*i*2.

The multiplexing unit 24*i*2 multiplexes the PCR packet which is output from the PCR packet generator 24*l*1, the PCR packet 24*g*1, video packet 24*g*2, audio packet 24*g*3, subtitle packet 24*g*4, PCR packet 24*g*5, video packet 24*g*6, audio packet 24*g*7, subtitle packet 24*g*8 and SI•EPG packet 24*g*9, and outputs the multiplexed TS packet.

The TAI/90 kHz counter converter 24*k* includes a counter of a power of 2, which operates at 90 kHz and sets the TAI time that is output from the time reproduction unit 24*a* to zero once again when the TAI time advances to 0-0xFFFFFFFF in 32 bits, i.e. in the hexadecimal notation. Further, this counter outputs 32 bits, which are obtained ultimately, to the RTP packet generator 24*n* as a counter value for an RTP header.

The RTP packet generator 24*n* adds the counter value for RTP header, which is output from the TAI/90 kHz counter converter 24*k*, to the TS packet which is output from the multiplexing unit 24*i*2. Thereby, the counter value for RTP header is written as a sending time in the "timestamp" field in the RTP header structure diagram defined by RFC 3550 as illustrated in FIG. 4A, and the TS packet is written in the "data payload" field.

In this manner, the RTP packet generator 24*n* outputs the TS packets or TS over IP packets, in which TS packets and sending times thereof are written as illustrated in FIG. 4A.

FIG. 5B is a functional block diagram illustrating another configuration example of the multiplexing apparatus which is applied to the broadcasting system of the first embodiment.

A multiplexing apparatus 24Y illustrated in FIG. 5B corresponds to the multiplexing apparatus 24 illustrated in FIG. 1 and FIG. 2, which handles TTS packets.

The configuration of the multiplexing apparatus 24Y is similar to the configuration of the multiplexing apparatus 24X. Thus, in FIG. 5B, parts identical to those in FIG. 5A are denoted by the same reference signs, and an overlapping description is avoided. Different points from the multiplexing apparatus 24X will be described.

Since the multiplexing apparatus 24Y handles TTS packets, each of the encoders 22(#1) to 22(#4) corresponds to the encoder 22Y illustrated in FIG. 3B.

The multiplexing apparatus 24Y is configured such that a TTS separation (delay/jitter absorption) unit 24*e*, a TAI/27 MHz counter converter 24*j* and a TTS packet generator 24*m* are added to the multiplexing apparatus 24X.

The TAI/27 MHz/90 kHz converter 24*c* converts the TAI time, which is output from the time reproduction unit 24*a*, to time with precision of 90 kHz, and outputs the time with the precision of 90 kHz to the RTP separation (delay/jitter absorption) unit 24*d*. In addition, the TAI/27 MHz/90 kHz converter 24*c* converts the TAI time, which is output from the time reproduction unit 24*a*, to time with precision of 27 MHz, and outputs the time with the precision of 27 MHz to the TTS separation (delay/jitter absorption) unit 24*e*.

Based on the time with the precision of 90 kHz which is output from the TAI/27 MHz/90 kHz converter 24*c*, the RTP separation (delay/jitter absorption) unit 24*d* performs correction of a delay and jitter for a TS over IP packet included in the IP packet which is output from the IP-SW 23, by using timestamp information which is stamped on an RTP packet including a plurality of TTS packets in the IP packet. Then, the RTP separation (delay/jitter absorption) unit 24*d* separates the TTS packets from the RTP packet, and outputs the separated TTS packets to the TTS separation (delay/jitter absorption) unit 24*e*.

The TTS separation (delay/jitter absorption) unit 24*e* is provided between the RTP separation (delay/jitter absorption) unit 24*d* and PCR/video/audio/subtitle/SI•EPG separation unit 24*f*. Based on the time with the precision of 27 MHz which is converted by the TAI/27 MHz/90 kHz converter 24*c*, and the timestamp information which is stamped on the TTS packets separated by the RTP separation (delay/jitter absorption) unit 24*d*, the TTS separation (delay/jitter absorption) unit 24*e* performs absorption of a delay and jitter, separates the TS packets from the TTS packets, and outputs the separated TS packets to the PCR/video/audio/subtitle/SI•EPG separation unit 24*f*. Thereby, the TTS separation (delay/jitter absorption) unit 24*e* absorbs a delay and jitter in the TTS packets.

IPTVFJ STD-0009 stipulates a standard in a case of performing TV broadcast by using the Internet, for example, as in the case of optical TV broadcast. According to this standard, in TV broadcast using the Internet, video can be uniformized with the precision of 90 kHz. In the TTS used here, in the TTS packet of 192 bytes, the first four bytes, i.e., 32 bits, area timestamp field having the precision of 27 MHz. The other 188 bytes are a TS packet.

Accordingly, by using both the precision of 90 kHz and the precision of 27 MHz as in the RTP separation (delay/jitter absorption) unit 24*d* and TTS separation (delay/jitter absorption) unit 24*e*, the jitter can be absorbed with higher precision.

Since 90 kHz is identical to the precision of controlling the timing of sending video of PTS and DTS, the RTP separation (delay/jitter absorption) unit 24*d* can absorb jitter with the precision of 90 kHz.

In addition, IPTVFJ STD-0009 is determined based on a standard which assumes that analog broadcast of NTSC is viewed by a cathode ray tube. Thus, scanning lines are swept at 30 Hz in the case of black-and-white video and at 29.970 . . . Hz, which is multiplied by 1000/1001 for color modulation, in the case of color video.

In this state, if a fluctuation occurs in 27 MHz that is the precision of the timestamp field, such a disorder occurs that black-and-white video becomes color video or, conversely, color video becomes black-and-white video. In order to avoid this, the timestamp is stamped on the TTS packet with the precision of 27 MHz by the TAI/27 MHz/90 kHz converter 24*c* and TTS separation (delay/jitter absorption) unit 24*e*.

In the same manner as in the case of the multiplexing apparatus 24X, the PCR/video/audio/subtitle/SI•EPG separation unit 24*f* separates the TS packets, which are separated by the TTS separation (delay/jitter absorption) unit 24*e*, into packets according to predetermined kinds, and outputs the separated packets to the multiplexing unit 24*i*2.

The TAI/27 MHz counter converter 24*j* includes a counter of a power of 2, which operates at 27 MHz and sets the TAI time that is output from the time reproduction unit 24*a* to zero once again when the TAI time advances to 0-0xFFFFFFFF in 32 bits, i.e. in the hexadecimal notation. Further, this counter outputs 32 bits, which are obtained ultimately, to the TTS packet generator 24*m* as a counter value for a TTS header.

The TTS packet generator 24*m* is provided between the multiplexing unit 24*i*2 and RTP packet generator 24*n*. The TTS packet generator 24*m* adds the 32-bit counter value for TTS header, which is output from the TAI/27 MHz counter converter 24*j*, to the TS packet which is output from the multiplexing unit 24*i*2. Thereby, the TTS packet generator 24*m* generates a TTS packet of a timestamp-added TS format, and outputs the TTS packet to the RTP packet generator 24*n*. Note that the counter value for TTS header, which is output from the TAI/27 MHz counter converter 24*j*, represents a time of sending this TTS packet.

The RTP packet generator 24*n* adds the counter value for RTP header, which is output from the TAI/90 kHz counter converter 24*k*, to the TTS packet which is output from the TTS packet generator 24*m*. Thereby, the counter value for RTP header is written as a sending time in the "timestamp" field in the RTP header structure diagram defined by RFC 3550 as illustrated in FIG. 4B, and the TTS packet is written in the "data payload" field.

In this manner, the RTP packet generator 24*n* outputs the IP packet in which TTS packets and sending times thereof are written as illustrated in FIG. 4B.

As described above, the multiplexing apparatus 24X, 24Y receives TS over IP packets from the encoders 22X, 22Y, which are disposed at physically remote places, for example, as in a virtual environment on a cloud computing system. Based on the timestamp of the RTP header, the multiplexing apparatus 24X, 24Y compensates for a delay and jitter of the transmission path, and then performs multiplexing. As regards the PCR packet, correction is made based on an internally re-generated time, or a new PCR packet is internally generated, and thus multiplexing can be performed.

FIG. 6A is a functional block diagram illustrating a configuration example of a system switching apparatus which is applied to the broadcasting system of the first embodiment.

As regards a system switching apparatus 30X illustrated in FIG. 6A, FIG. 6A illustrates a detailed configuration of the system switching apparatus 30X in a case where the system switching apparatus 30 illustrated in FIG. 1 and FIG. 2 handles TS packets, without handling TTS packets.

The system switching apparatus 30X is an apparatus for executing switching between a broadcast TS from the working system 20A and a broadcast TS from the auxiliary system 20B. The system switching apparatus 30X includes a processor (not shown) and a program memory (not shown), and includes, for each of the working system 20A and auxiliary system 20B, a time reproduction unit 30*a*, a TAI/STC converter 30*b*, a TAI/27 MHz/90 kHz converter 30*c*, an RTP separation (delay/jitter absorption) unit 30*d*, a PCR packet generator 30*i*1, a system switching timing control buffer 30*p*, and a multiplexing unit 30*i*2. Besides, the system switching apparatus 30X may include, as an option, a PCR packet generation timing controller 30*h*.

In FIG. 6A, the parts for the working system 20A are distinguished by adding "A" after reference sign "30", and the parts for the auxiliary system 20B are distinguished by adding "B" after reference sign "30".

In addition, the system switching apparatus 30X includes a system switching timing generator 30*q* and a selector 30*r*, which are common to the working system 20A and auxiliary system 20B.

By this configuration, the system switching apparatus 30X can realize a synchronization control function of executing seamless switching between the broadcast TS from the working system 20A and the broadcast TS from the auxiliary system 20B.

The above-described parts are realized by causing the processor to execute programs stored in the program memory.

Note that the time reproduction unit 30*a*, TAI/STC converter 30*b*, TAI/27 MHz/90 kHz converter 30*c*, RTP separation (delay/jitter absorption) unit 30*d*, PCR packet generation timing controller 30*h*, PCR packet generator 30*i*1, system switching timing control buffer 30*p*, and multiplexing unit 30*i*2 have the same configurations between the working system 20A and auxiliary system 20B, and therefore these parts will be described without distinction between the working system 20A and auxiliary system 20B.

IP packets from a multiplexing apparatus 24A and a server 60A for the working system 20A are input to the system switching apparatus 30X via an IP-SW 23A which is not illustrated in FIG. 1 or FIG. 2. In addition, IP packets from a multiplexing apparatus 24B and a server 60B for the auxiliary system 20B are input to the system switching apparatus 30X via an IP-SW 23B which is not illustrated in FIG. 1 or FIG. 2. Note that the system switching apparatus 30X handles TS packets without handling TTS packets, and thus each multiplexing apparatus 24A, 24B corresponds to the multiplexing apparatus 24X illustrated in FIG. 5A.

The time reproduction unit 30*a* has the same configuration as the time reproduction unit 22*a*. The time reproduction unit 30*a* samples TAI time that is stamped on the PTP packet included in the IP packet from the IP-SW 23, and outputs the sampled TAI time to the TAI/STC converter 30*b* and TAI/27 MHz/90 kHz converter 30*c*.

The TAI/STC converter 30*b* has the same configuration as the TAI/STC converter 22*b*. The TAI/STC converter 30*b* converts the TAI time, which is output from the time reproduction unit 30*a*, to time for PCR which is used for synchronization control between the systems.

The calculation procedure of the time for PCR in the TAI/STC converter 30*b* is the same as the calculation procedure in the TAI/STC converter 22*b*, so an overlapping description is avoided.

The TAI/STC converter 30*b* outputs the calculated time for PCR to the PCR packet generator 30*i*1.

The TAI/27 MHz/90 kHz converter 30*c* converts the TAI time, which is output from the time reproduction unit 30*a*, to time with precision of 90 kHz, and outputs the time with the precision of 90 kHz to the RTP separation (delay/jitter absorption) unit 30*d*.

Based on the time with the precision of 90 kHz which is output from the TAI/27 MHz/90 kHz converter 30*c*, the RTP separation (delay/jitter absorption) unit 30*d* performs correction of a delay and jitter by using timestamp information which is stamped on an RTP packet including a plurality of TS packets in the TS over IP packet included in the IP packet which is output from the IP-SW 23. Then, the RTP separation (delay/jitter absorption) unit 30*d* separates the TS packets from the RTP packet. Thereby, the RTP separation (delay/jitter absorption) unit 30*d* absorbs a delay and jitter in the RTP.

The system switching timing control buffer 30*p* is a buffer which absorbs an error of a TS packet which becomes a switching point between the working system 20A and auxiliary system 20B, i.e. a splicing point. The system switching timing control buffer 30*p* holds each TS packet which is separated by the RTP separation (delay/jitter absorption) unit 30*d*, and outputs each held TS packet to the multiplexing unit 30*i*2 in accordance with an instruction by the system switching timing generator 30*q*. For example, when the encoder 22X generated the TS, if control is executed to effect switching at a certain frame, a GOP starts and an I picture starts at this frame. "1" is set in the field of a splicing point flag that is the beginning of this TS packet. Thereby, the switching point can be explicitly indicated.

However, as in the case of the working system 20A and auxiliary system 20B, when TS packets arrive via different paths, a delay generally occurs between the TS packets. In addition, these two paths do not necessarily coincide in the bit level. For example, in the case where the working system 20A is first powered on and then the auxiliary system 20B is powered on, an error in timing occurs between the TS packet which is sent from the working system 20A and the TS packet which is sent from the auxiliary system 20B. Consequently, there may be a case in which the state of the system switching timing control buffer 30Ap and the state of the system switching timing control buffer 30Bp do not agree. For example, at a time of the start of video, the video begins with a complex picture, or a simple picture intervenes in the video. Thereby, the amount of codes accumulated in the system switching timing control buffer 30Ap and the amount of codes accumulated in the system switching timing control buffer 30Bp becomes different, and the timing at which the TS packet arrives at the switching point deviates.

Accordingly, when switching is executed from the working system 20A to the auxiliary system 20B, the system switching timing generator 30q executes the switching by two methods described below, in order to cancel an error in timing when the TS packet arrives at the switching point.

A first method is a switching in a case where the TS packet, which is designated as the switching point, first arrives from the working system 20A and then arrives from the auxiliary system 20B. In this case, the system switching timing generator 30q controls the system switching timing control buffer 30Ap, 30Bp, such that the TS packet is not sent during the period from when the TS packet designated as the switching point arrives at the system switching timing control buffer 30Ap to when the TS packet designated as the switching point arrives at the system switching timing control buffer 30Bp, and such that the TS packet is sent at a timing when the TS packet designated as the switching point arrives at the system switching timing control buffer 30Bp.

Figure 7:
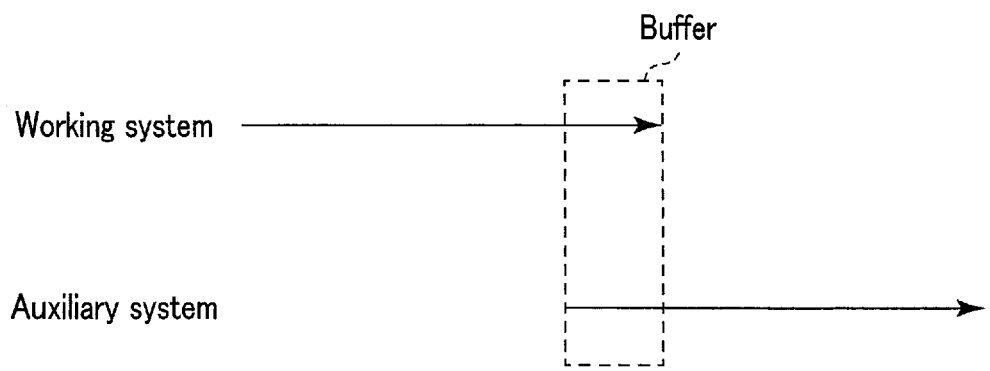
FIG. 7 is a schematic view illustrating a state in which a TS packet from a working system and a TS packet from an auxiliary system overlap at a time of switching in the first embodiment.

Conversely, a second method is a switching in a case where the TS packet, which is designated as the switching point, first arrives from the auxiliary system 20B and then arrives from the working system 20A. In this case, if the TS packet is sent at a timing when the TS packet has arrived at the system switching timing control buffer 30Bp, the TS packet from the working system 20A and the TS packet from the auxiliary system 20B overlap at the time of switching, as illustrated in FIG. 7. In order to avoid this, the system switching timing generator 30q controls the system switching timing control buffers 30Ap and 30Bp such that the TS packet is not sent from the system switching timing control buffer 30Bp until the end of the sending of the TS packet from the system switching timing control buffer 30Ap.

In this manner, the system switching timing generator 30q controls the system switching timing control buffers 30Ap and 30Bp such that the TS packet is sent at a proper timing.

Figure 8:
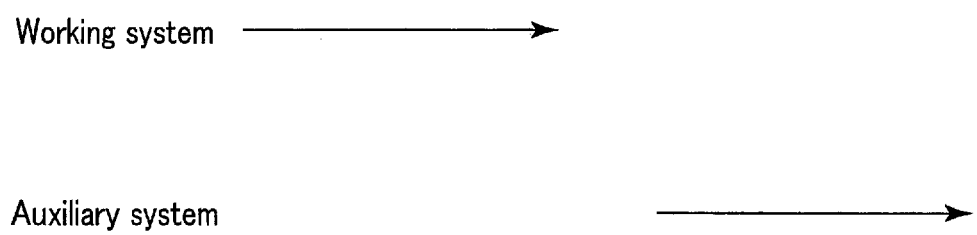
FIG. 8 is a schematic view illustrating a state in which a gap occurs between the TS packet from the working system and the TS packet from the auxiliary system in the first embodiment.

As regards the timing, for example, switching is executed from the packet in which "1" is designated in the splicing point flag. In this case, as described above, as illustrated in FIG. 7, there may be a case in which the TS packet from the working system 20A and the TS packet from the auxiliary system 20B overlap at the time of switching. Furthermore, as illustrated in FIG. 8, there may be a case in which a gap occurs between the TS packet from the working system 20A and the TS packet from the auxiliary system 20B. In this case, the timing of data is adjusted by sending a packet for padding during a period corresponding to the gap.

In this manner, the system switching timing generator 30q executes the system switching. Actually, when the system switching is executed, the system switching can be executed at a time, or for each PTP, based on the behavior of the multiplexing apparatus 24X connected in a preceding stage, and the behavior of the encoder 22X connected in a further preceding stage.

The system switching timing generator 30q determines the timing for switching the systems in this manner, and executes, at the determined timing, the read start from the system switching timing control buffer 30Ap and the read stop from the system switching timing control buffer 30Bp, or the read start from the system switching timing control buffer 30Bp and the read stop from the system switching timing control buffer 30Ap, and outputs to the selector 30r a switching control signal in which the timing for switching the systems is designated.

The system switching timing control buffer 30p, in which the read start is designated by the system switching timing generator 30q, sends the TS packet to the corresponding multiplexing unit 30i2. On the other hand, the system switching timing control buffer 30p, in which the read stop is designated by the system switching timing generator 30q, stops the sending of the TS packet to the corresponding multiplexing unit 30i2.

In the meantime, the broadcasting system 1, 1' of the present embodiment can execute such control that the TS packet may not arrive, at the time of switching between the working system 20A and auxiliary system 20B. This is realized by causing the encoder 22X to operate in a manner to ensure that a gap exists at a certain timing without fail, as illustrated in FIG. 9.

Figure 9:
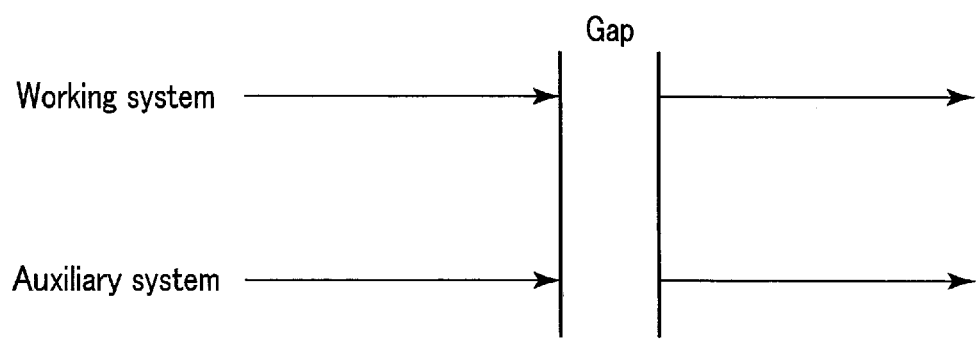
FIG. 9 is a schematic view illustrating a state in which a predetermined gap exists between TS packets in the working system and auxiliary system.

FIG. 9 is a schematic view illustrating a state in which a predetermined gap exists between TS packets in the working system and auxiliary system.

According to this control, since the timing at which the gap exists is known in advance, the switching point can be designated by upper-level control. Thus, the system switching timing control buffer 30p can be omitted.

The PCR packet generator 30i1 generates a PCR packet, adds a PCR value, which is output from the TAI/STC converter 30b, to the generated PCR packet, and outputs the PCR packet to the multiplexing unit 30i2. Besides, when the PCR packet generation timing controller 30h is provided, the PCR packet generator 30i1 generates a PCR packet in accordance with the control by the PCR packet generation timing controller 30h, adds the PCR value, which is output from the TAI/STC converter 30b, to the generated PCR packet, and outputs the PCR packet to the multiplexing unit 30i2.

The multiplexing unit 30i2 multiplexes the PCR packet which is output from the PCR packet generator 30i1, and the TS packet which is sent from the system switching timing control buffer 30p, and outputs the multiplexed TS packet to the selector 30r.

The selector 30r selects either the TS packet from the multiplexing unit 30Ai2 or the TS packet from the multiplexing unit 30Bi2, according to the switching control signal which is output from the system switching timing generator 30q, and outputs the selected TS packet to the STL transmission apparatus/OFDM modulator.

FIG. 6B is a functional block diagram illustrating another configuration example of the system switching apparatus which is applied to the broadcasting system of the first embodiment.

A system switching apparatus 30Y illustrated in FIG. 6B corresponds to the system switching apparatus 30 illustrated in FIG. 1 and FIG. 2, which handles TTS packets.

The configuration of the system switching apparatus 30Y is similar to the configuration of the system switching apparatus 30X. Thus, in FIG. 6B, parts identical to those in FIG. 6A are denoted by the same reference signs, and an overlapping description is avoided. Different points from the system switching apparatus 30X will be described.

Since the system switching apparatus 30Y handles TTS packets, the multiplexing apparatus 24A illustrated in FIG. 6B corresponds to the multiplexing apparatus 24Y illustrated in FIG. 5B.

The system switching apparatus 30Y is configured such that a TTS separation (delay/jitter absorption) unit 30e is added between the RTP separation (delay/jitter absorption) unit 30d and system switching timing control buffer 30p in the system switching apparatus 30X.

Further, the TAI/27 MHz/90 kHz converter 30c converts the TAI time, which is output from the time reproduction unit 30a, to time with precision of 90 kHz, and outputs the time with the precision of 90 kHz to the RTP separation (delay/jitter absorption) unit 30d. In addition, the TAI/27 MHz/90 kHz converter 30c converts the TAI time, which is output from the time reproduction unit 30a, to time with precision of 27 MHz, and outputs the time with the precision of 27 MHz to the TTS separation (delay/jitter absorption) unit 30e.

Based on the time with the precision of 90 kHz converted by the TAI/27 MHz/90 kHz converter 30c, the RTP separation (delay/jitter absorption) unit 30d performs correction of a delay and jitter by using timestamp information which is stamped on an RTP packet including a plurality of TTS packets in the TS over IP packet included in the IP packet which is output from the IP-SW 23. Then, the RTP separation (delay/jitter absorption) unit 30d separates the TTS packets from the RTP packet. Thereby, the delay and jitter in the RTP are absorbed.

Based on the time with the precision of 27 MHz which is converted by the TAI/27 MHz/90 kHz converter 30c, and based on the timestamp information which is stamped on the TTS packets separated by the RTP separation (delay/jitter absorption) unit 30d, the TTS separation (delay/jitter absorption) unit 30e performs absorption of a delay and jitter, and separates the TS packets from the TTS packets.

In the system switching apparatus 30X, the system switching timing control buffer 30p holds each TS packet which is separated by the RTP separation (delay/jitter absorption) unit 30d, and outputs each held TS packet to the multiplexing unit 30i2 in accordance with an instruction by the system switching timing generator 30q. On the other hand, in the system switching apparatus 30Y, the system switching timing control buffer 30p holds each TS packet which is separated by the TTS separation (delay/jitter absorption) unit 30e, and outputs each held TTS packet to the multiplexing unit 30i2 in accordance with an instruction by the system switching timing generator 30q.

According to the broadcasting system 1, 1' of the present embodiment, even in the case where the devices provided in each of the working system 20A and auxiliary system 20B in the compression multiplex system control apparatus 10,10', such as the encoders 22, multiplexing apparatus 24 and system switching apparatus 30, are distributedly disposed at physically remote places, for example, as in a virtual environment on a cloud computing system, the devices can be connected by only Ethernet. At the same time, the counter value, which is uniquely calculated on the basis of the exact time that is based on PTP, is given, and the STC counter values can be synchronized. Therefore, both the complete IP network implementation and the inter-system switching can be realized.

In the Ethernet, since IP data flows can be classified, a plurality of transmission paths can logically be formed by one cable by the complete IP network implementation. Accordingly, the broadcasting system 1, 1' of the present embodiment is free from the use of a coaxial cable. Moreover, there is no need to distribute signals by a coaxial cable (SDI, DVB-ASI), and the configuration can be simplified.

In addition, in the broadcasting system 1, 1' of the present embodiment, as described above, the respective devices may be distributedly disposed at physically remote places. Thus, the broadcasting system 1, 1' can be constructed by devices which are disposed at places where physical locations are unidentifiable, such as in a virtual environment on a cloud computing system.

According to this configuration, even when TS packets or TTS packets, which are generated at a plurality of locations including applications, are put together as one service (multi-angle, picture-in-picture, etc.), the video/audio can be synchronized and presented.

Note that, on the cloud computing system, the physical position, arrangement, network configuration, and the like of the device, which executes an application, cannot correctly be understood or controlled. The broadcasting system 1, 1' of the present embodiment can be constructed even in such a configuration that the places of real entities are unknown. Thus, regardless of the positions, arrangement, network configuration and the like of the devices, STC count values can be synchronized between the devices.

Furthermore, even if PTP packets are not used for the synchronization between devices which are installed at physically remote places, such a configuration is possible that radio waves are received from a satellite positioning system such as a GPS, and an operation as a PTP server is enabled.

In this manner, according to the broadcasting system 1, 1' of the present embodiment, even when devices are installed at remote places, such as on a cloud computing system, the precision of time synchronization between the devices can be improved by using the PTP (IP packet/Ethernet) and the STC counter values can be synchronized between the devices, based on the time information reproduced from the PTP. Therefore, seamless system switching between the working system 20A and auxiliary system 20B can be realized by only the connection of an Ethernet cable.

Second Embodiment

A broadcasting system of a second embodiment will be described.

An entire configuration example of the broadcasting system of the second embodiment is similar to the entire configuration example illustrated in FIG. 1, and an entire configuration example of a modification of the broadcasting system of the second embodiment is similar to the entire configuration example illustrated in FIG. 2.

In the broadcasting system of the second embodiment, the detailed configurations of the encoder and multiplexing apparatus are different from those of the broadcasting system of the first embodiment.

Accordingly, hereinafter, parts identical to those described in the first embodiment are denoted by the same reference signs used in the first embodiment, and an overlapping description is avoided. Different configurations from the first embodiment will mainly be described.

Figure 10A:
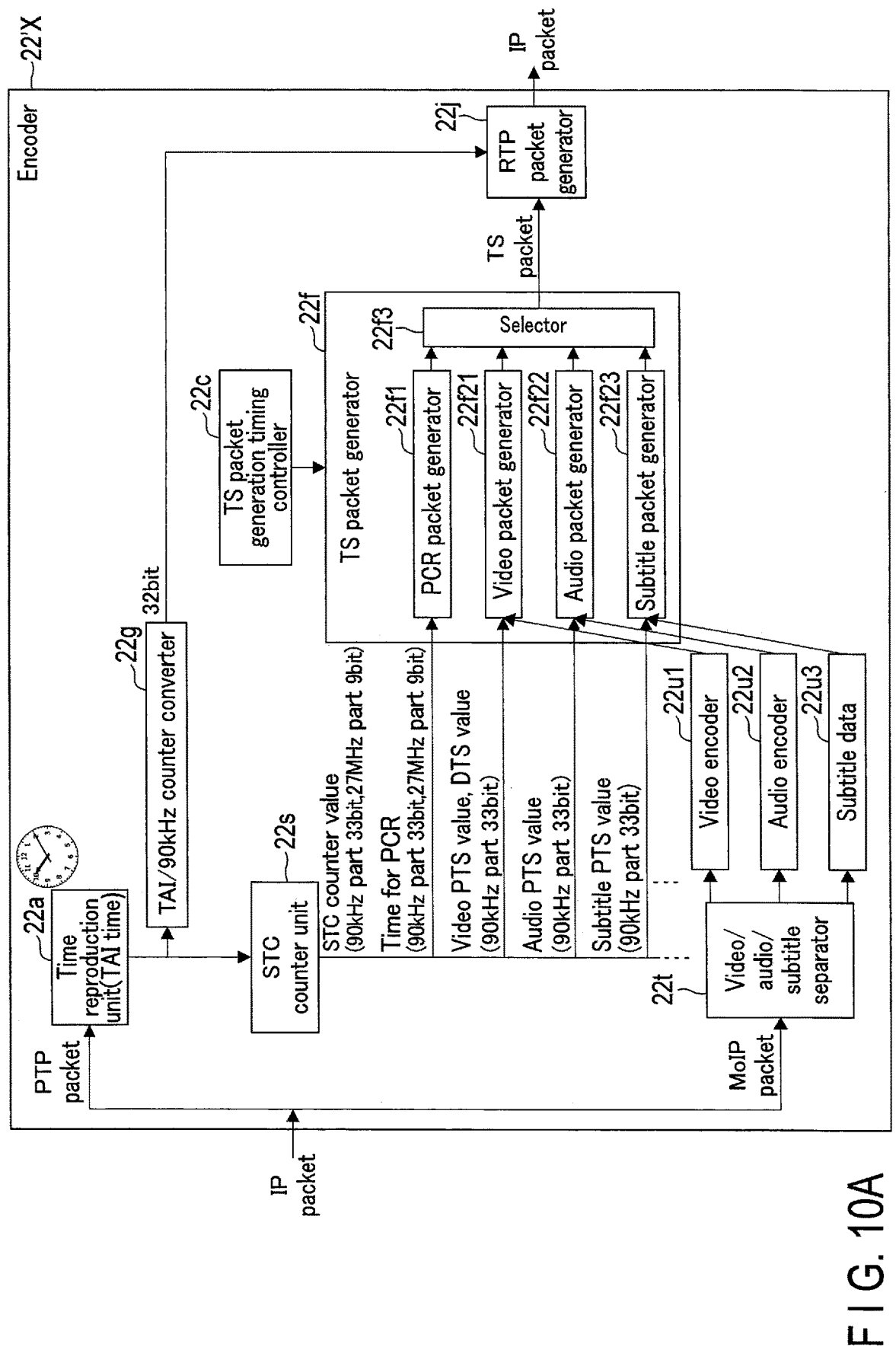
FIG. 10A is a functional block diagram illustrating a configuration example of an encoder which is applied to a broadcasting system of a second embodiment (a case of handling a TS packet)

FIG. 10A is a functional block diagram illustrating a configuration example of an encoder which is applied to a broadcasting system of the second embodiment.

An encoder 22'X illustrated in FIG. 10A handles TS packets, without handling TTS packets. The encoder 22'X has the same configuration as the encoder 22X illustrated in FIG. 3A, except that the encoder 22'X, compared to the encoder 22X illustrated in FIG. 3A, includes an STC counter unit 22s in place of the TAI/STC converter 22b, and includes a video/audio/subtitle separator 22t, a video encoder 22u1 and an audio encoder 22u2 in place of the video/audio/subtitle encoder 22e.

In the encoder 22'X, a synchronization control apparatus is realized by the time reproduction unit 22a, STC counter unit 22s, TAI/90 kHz counter converter 22g, and RTP packet generator 22j.

Figure 11A:
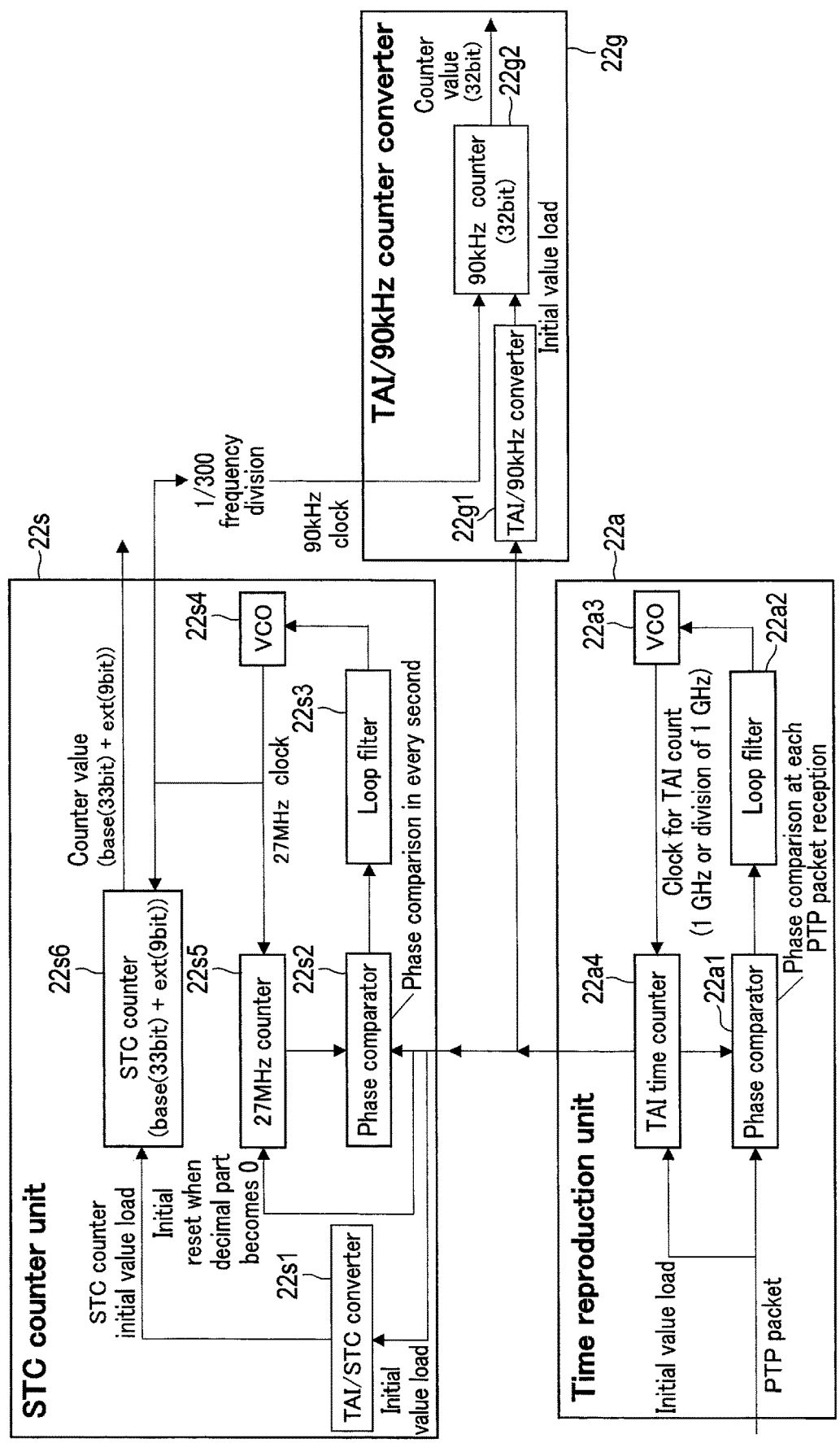
FIG. 11A is a functional block diagram illustrating a detailed configuration example of a time reproduction unit, an STC counter unit and a TAI/90 kHZ counter converter in the second embodiment (a case of handling a TS packet)

FIG. 11A is a functional block diagram illustrating a detailed configuration example of the time reproduction unit, STC counter unit and TAI/90 kHZ counter converter in the second embodiment.

The time reproduction unit 22a includes a phase comparator 22a1, a loop filter 22a2, a VCO (Voltage-controlled oscillator) 22a3, and a TAI time counter 22a4.

The STC counter unit 22s includes a TAI/STC converter 22s1, a phase comparator 22s2, a loop filter 22s3, a VCO 22s4, a 27 MHz counter 22s5, and an STC counter 22s6.

The TAI/90 kHz counter converter 22g includes a TAI/90 kHz converter 22g1, and a 90 kHz counter 22g2.

When the integer second of the TAI time counts up in the TAI time counter 22a4 of the time reproduction unit 22a, or when the 27 MHz counter 22s5 of the STC counter unit 22s returns to 0, the phase comparator 22s2 compares the phases of both counters (e.g. in every second). When the 27 MHz counter 22s5 is fast, such control is executed that the oscillation frequency of the VCO 22s4 is lowered via the loop filter 22s3. When the 27 MHz counter 22s5 is slow, such control is executed that the oscillation frequency of the VCO 22s4 is increased via the loop filter 22s3. This is the same as the operation of a general PLL.

The STC counter unit 22s executes initial reset of the 27 MHz counter 22s5 when the decimal part of the TAI time becomes zero.

In addition, the 27 MHz counter 22s5 counts up by the clock generated from the VCO 22s4. The count of the 27 MHz counter 22s5 returns to zero when 27 MHz cycles have passed.

The clock generated from the VCO 22s4 is frequency-divided to 1/300, and is input to the 90 kHz counter 22g2.

In addition, the TAI time, which is output from the TAI time counter 22a4, is input to TAI/90 kHz converter 22g1, and the value converted to 90 kHz is loaded in the 90 kHz counter 22g2 by the TAI/90 kHz converter 22g1. Responding to this, a 32-bit count value is output from the 90 kHz counter 22g2. This count value is written to the RTP header as the 32-bit timestamp illustrated in FIG. 4.

Besides, at a time point when the difference of the comparison by the phase comparator 22s2 decreases to a specified value or less, it is regarded that the PLL is set in the locked state, and the TAI time is sampled and converted to an STC counter value by the TAI/STC converter 22s1, and loaded as an initial value in the STC counter 22s6. Subsequently, the STC counter 22s6 operates at 27 MHz which is locked to the TAI time.

Thereafter, the STC counter 22s6 is made to operate independently, and the initial value of the STC counter value is found from the TAI time and loaded in the STC counter 22s6. Although the STC counter 22s6 operates at 27 MHz, the STC counter 22s6 is locked by PLL to the clock for TAI count (1 GHz or a division of 1 GHz) which is reproduced from the PTP packet in order to find the TAI time in the TAI time counter 22a4.

The STC counter 22s6 is not easy to handle, since the base of the 90 kHz operation is 33 bits and the extension of the 27 MHz operation is 9 bits (values are 0-299). Thus, by the 27 MHz counter 22s5 which operates at 27 MHz, phase comparison is performed in every second (in every count-up of a second), and the VCO 22s4 is controlled and locked.

Figure 10B:
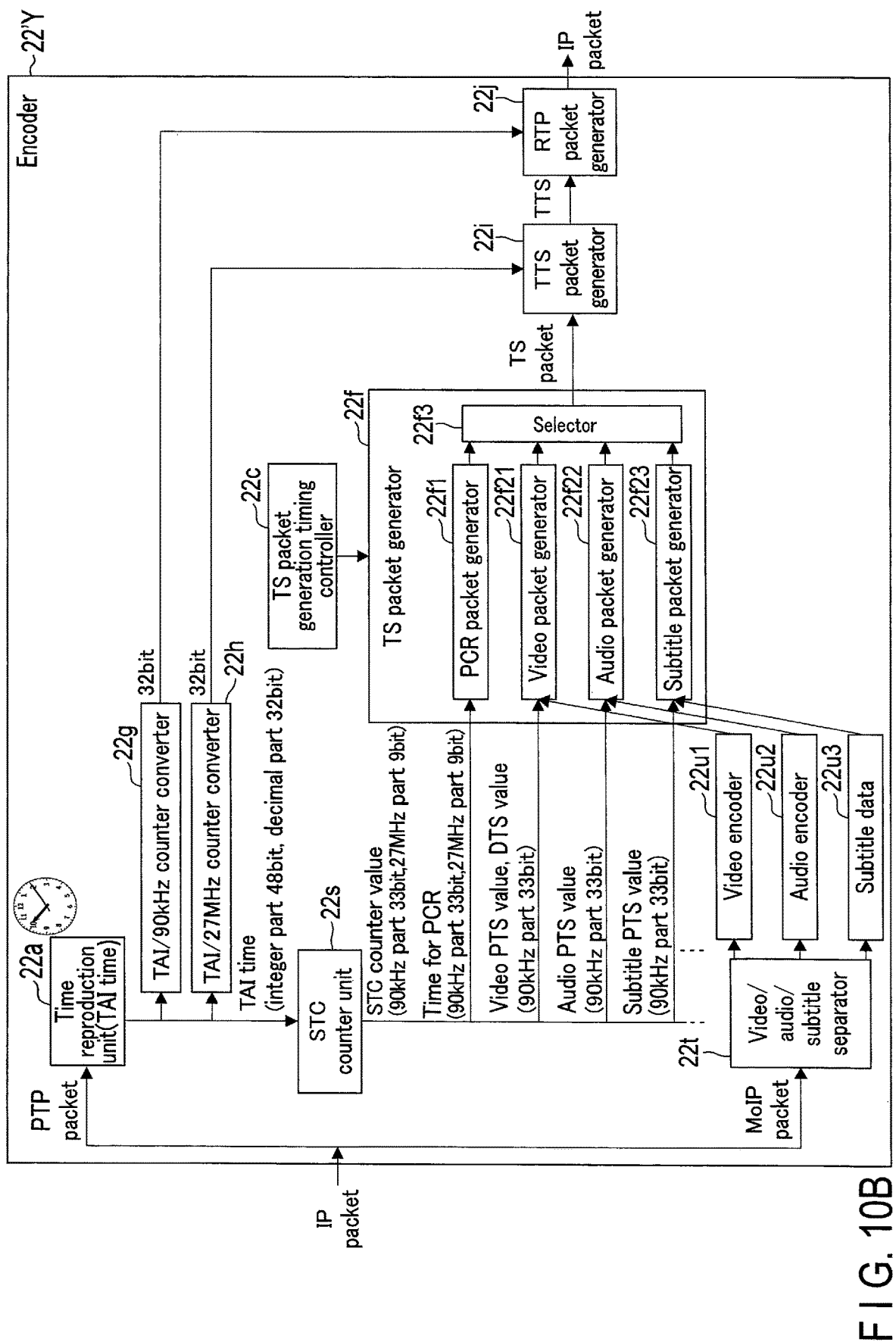
FIG. 10B is a functional block diagram illustrating another configuration example of the encoder which is applied to the broadcasting system of the second embodiment (a case of handling a TTS packet)

FIG. 10B is a functional block diagram illustrating another configuration example of the encoder which is applied to the broadcasting system of the second embodiment.

An encoder 22'Y illustrated in FIG. 10B handles TTS packets. The encoder 22'Y has the same configuration as the encoder 22Y illustrated in FIG. 3B, except that the encoder 22'Y, compared to the encoder 22Y illustrated in FIG. 3B, includes an STC counter unit 22s in place of the TAI/STC converter 22b, and includes a video/audio/subtitle separator 22t, a video encoder 22u1 and an audio encoder 22u2 in place of the video/audio/subtitle encoder 22e. Accordingly, in FIG. 10B, parts identical to those in FIG. 3B are denoted by the same reference signs, and an overlapping description is avoided. Different points from the encoder 22Y will be described.

In the encoder 22'Y, a synchronization control apparatus is realized by the time reproduction unit 22a, STC counter unit 22s, TAI/90 kHz counter converter 22g, TAI/27 MHz counter converter 22h, TTS packet generator 22i, and RTP packet generator 22j.

Figure 11B:
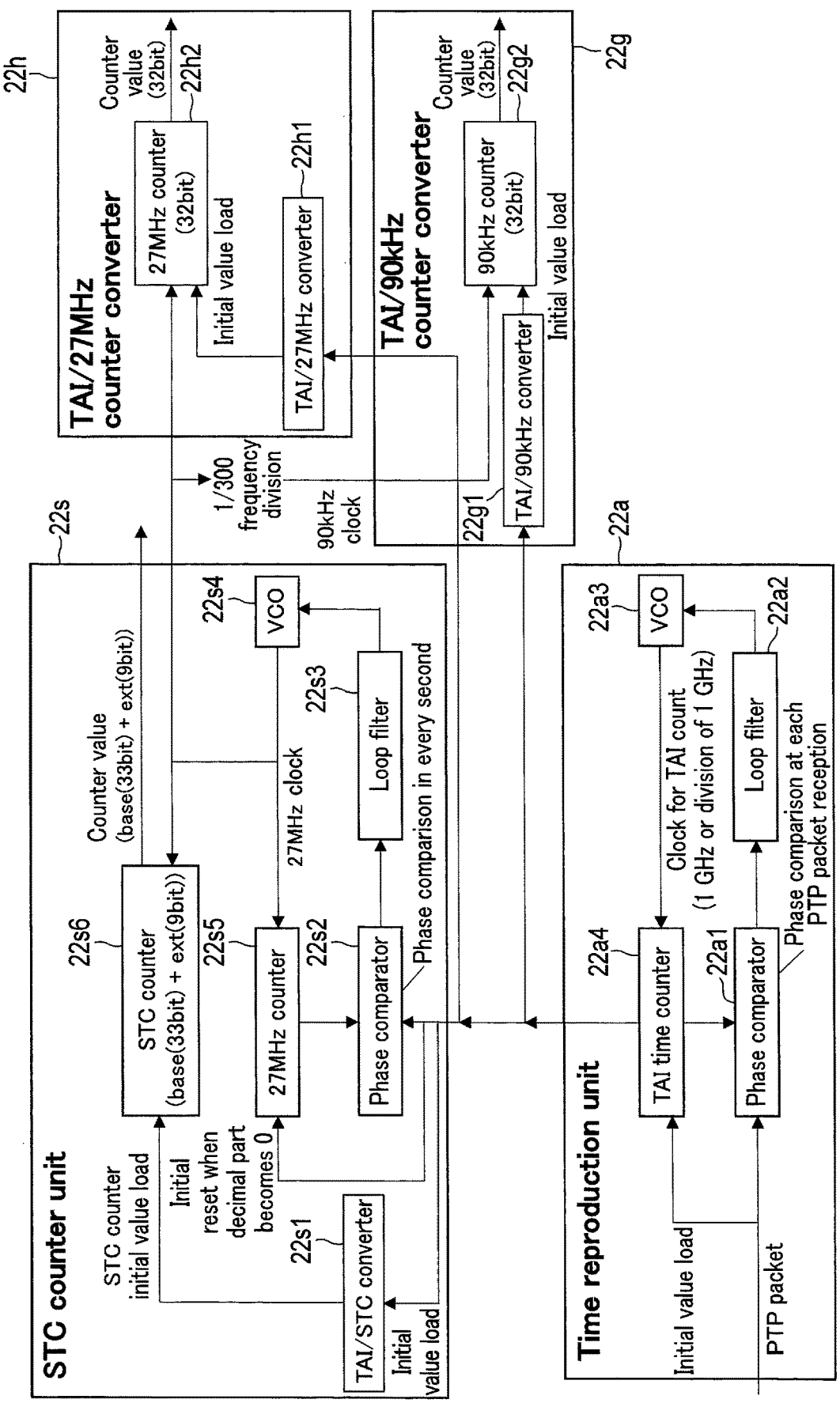
FIG. 11B is a functional block diagram illustrating a detailed configuration example of the time reproduction unit, the STC counter unit, the TAI/90 kHZ counter converter and a TAI/27 MHZ counter converter in the second embodiment (a case of handling a TTS packet)

FIG. 11B is a functional block diagram illustrating a detailed configuration example of the time reproduction unit, the STC counter unit, the TAI/90 kHZ counter converter and the TAI/27 MHZ counter converter in the second embodiment.

The functional block diagram illustrated in FIG. 11B is similar to the functional block diagram illustrated in FIG. 11A. Accordingly, in FIG. 11B, parts identical to those in FIG. 11A are denoted by the same reference signs, and an overlapping description is avoided. Only different parts will be described.

Specifically, in the block diagram illustrated in FIG. 11B, the TAI/27 MHz counter converter 22h is added to the block diagram illustrated in FIG. 11A. The TAI/27 MHz counter converter 22h includes a TAI/27 MHz converter 22h1, and a 27 MHz counter 22h2.

The TAI/27 MHz converter 22h1 samples the TAI time which is output from the TAI time counter 22a4, converts the sampled TAI time to a counter value of 27 MHz, and loads this counter value as an initial value in the 27 MHz counter 22h2.

The 27 MHz counter 22h2 is counted up by the clock generated from the VCO 22s4, and outputs a 32-bit count value. This count value is written as a 32-bit timestamp illustrated in FIG. 12.

FIG. 13A is a functional block diagram illustrating a configuration example of a multiplexing apparatus which is applied to the broadcasting system of the second embodiment.

A multiplexing apparatus 24'X illustrated in FIG. 13A handles TS packets. The multiplexing apparatus 24'X has the same configuration as the multiplexing apparatus 24X illustrated in FIG. 5A, except that the multiplexing apparatus 24'X includes an STC counter unit 24s in place of the TAI/STC converter 24b. The operation of the STC counter unit 24s is the same as the operation of the STC counter unit 22s provided in the encoder 22'X illustrated in FIG. 10A. In addition, in FIG. 13A, parts identical to those of the multiplexing apparatus 24X illustrated in FIG. 5A are denoted by the same reference signs, and an overlapping description is avoided.

In the multiplexing apparatus 24'X, a synchronization control apparatus is realized by the time reproduction unit 24a, STC counter unit 24s, TAI/27 MHz/90 kHz converter 24c, RTP separation (delay/jitter absorption) unit 24d, TAI/90 kHz counter converter 24k, and RTP packet generator 24n.

Figure 13B:
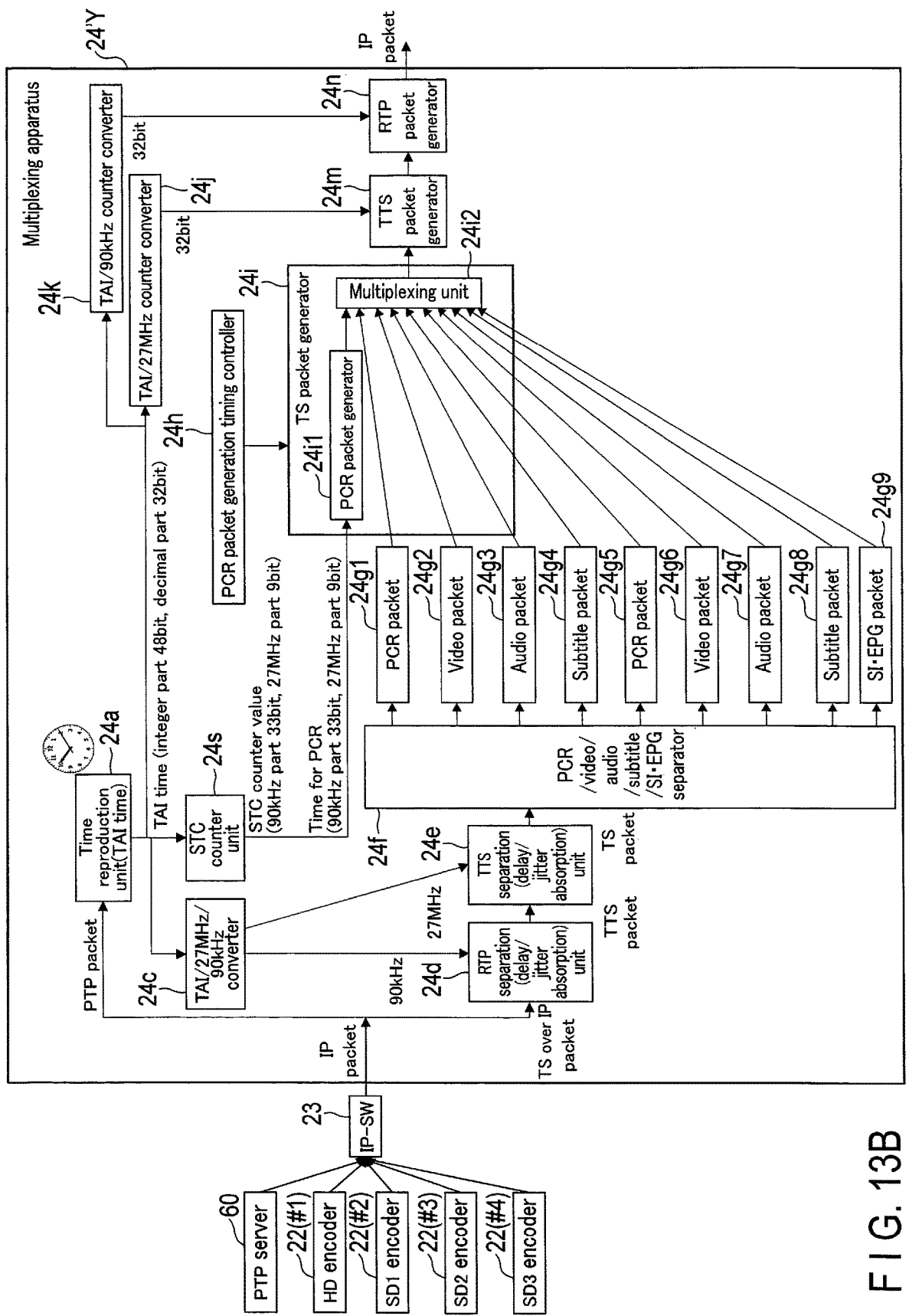
FIG. 13B is a functional block diagram illustrating another configuration example of the multiplexing apparatus which is applied to the broadcasting system of the second embodiment (a case of handling a TTS packet).

FIG. 13B is a functional block diagram illustrating another configuration example of the multiplexing apparatus which is applied to the broadcasting system of the second embodiment.

A multiplexing apparatus 24'Y illustrated in FIG. 13B handles TTS packets. The multiplexing apparatus 24'Y has the same configuration as the multiplexing apparatus 24Y illustrated in FIG. 5B, except that the multiplexing apparatus 24'Y includes an STC counter unit 24s in place of the TAI/STC converter 24b. The operation of the STC counter unit 24s is the same as the operation of the STC counter unit 22s provided in the encoder 22'X illustrated in FIG. 10A. In addition, in FIG. 13B, parts identical to those of the multiplexing apparatus 24Y illustrated in FIG. 5B are denoted by the same reference signs, and an overlapping description is avoided.

In the multiplexing apparatus 24'Y, a synchronization control apparatus is realized by the time reproduction unit 24a, STC counter unit 24s, TAI/27 MHz/90 kHz converter 24c, RTP separation (delay/jitter absorption) unit 24d, TTS separation (delay/jitter absorption) unit 24e, TAI/27 MHz counter converter 24j, TAI/90 kHz counter converter 24k, TTS packet generator 22m, and RTP packet generator 24n.

In this manner, in the configuration of the multiplexing apparatus 24'X, 24'Y of the present embodiment, the TAI/STC converter 24b in the multiplexing apparatus 24X, 24Y of the first embodiment is replaced with the STC counter unit 24s, the initial value of the STC counter value is set from the TAI time, and the STC counter 22s6 is self-driven. Even with this configuration, it is possible, as in the first embodiment, to give the counter value which is uniquely calculated on the basis of the exact time that is based on PTP, and to synchronize the STC counter values. Therefore, both the complete IP network implementation and the seamless inter-system switching can be realized.

As described above, according to the present embodiment, even if the working system 20A and auxiliary system 20B are disposed at remote places, or even if the encoders 22 and multiplexing apparatus 24 in the same system are disposed at remote places, it is possible to provide the broadcasting system 1, 1', which can adapt to IP-based implementation and to execute seamless inter-system switching between the working system 20A and auxiliary system 20B.

Furthermore, it is possible to provide the encoder 22, multiplexing apparatus 24 and system switching apparatus 30, which are applied to the broadcasting system 1, 1', and the synchronization control apparatus which is realized in the encoder 22 and multiplexing apparatus 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An encoder comprising:
   a time reproducer configured to communicate a PTP (Precision Time Protocol) packet and to reproduce TAI (International Atomic Time) time from the PTP packet;
   a first converter configured to determine a time length in which an STC (System Time Clock) counter value laps, to calculate a remainder of the time length relative to the TAI time, and to generate a time for PCR (Program Clock Reference) and a PTS (Presentation Time Stamp) value, based on the remainder;
   a first TS (Transport Stream) packet generator configured to generate a PCR packet, and to add the time for PCR to the PCR packet, thereby generating a first TS packet;
   a second TS packet generator configured to receive a video content packet, and to add the PTS value to the video content packet, thereby generating a second TS packet;
   a selector configured to select one of the first TS packet and the second TS packet;
   a counter configured to operate at a first frequency, and to count the TAI time reproduced by the time reproducer by using a counter which counts zero once again when the TAI time advances to a predetermined bit, thereby outputting an ultimately acquired value as a counter value for an RTP (Real-Time Transport Protocol) header; and
   an RTP packet generator configured to add the counter value for the RTP header to the TS packet selected by the selector, thereby generating an RTP packet.

2. The encoder of claim 1, further comprising:
   a second converter configured to operate at a second frequency which is different from the first frequency, and to count the TAI time reproduced by the time reproducer by using the counter which counts zero once again when the TAI time advances to a predetermined bit, thereby outputting an ultimately acquired value as a counter value for a TTS (Timestamped Transport Stream) header; and
   a TTS packet generator configured to add the counter value for the TTS header to the TS packet selected by the selector, thereby generating a TTS packet,
   wherein the RTP packet generator is configured to generate the RTP packet by adding the counter value for the RTP header to the TTS packet generated by the TTS packet generator in place of the TS packet selected by the selector.

3. A multiplexing apparatus comprising:
   a time reproducer configured to communicate a PTP (Precision Time Protocol) packet and to reproduce TAI (International Atomic Time) time from the PTP packet;
   a first converter configured to determine a time length in which an STC (System Time Clock) counter value laps, to calculate a remainder of the time length relative to the TAI time, and to generate a time for PCR (Program Clock Reference), based on the remainder;
   a second converter configured to convert the TAI time to a time with precision of a first frequency;
   a first delay jitter absorber configured to receive an IP packet, to perform, based on the time with the precision of the first frequency converted by the second converter, correction of a delay and jitter by using timestamp information which is stamped on an RTP (Real- Time Transport Protocol) packet including a plurality of TS (Transport Stream) packets in the IP packet, and to separate the TS packets from the RTP packet;
a separator configured to separate, according to predetermined kinds, the TS packets which are separated by the first delay jitter absorber;
a multiplexer configured to multiplex the TS packets separated by the separator;
a counter configured to operate at the first frequency, and to count the TAI time reproduced by the time reproducer by using a counter which counts zero once again when the TAI time advances to a predetermined bit, thereby outputting an ultimately acquired value as a counter value for an RTP header; and
an RTP packet generator configured to add the counter value for the RTP header to the TS packet multiplexed by the multiplexer, thereby generating an RTP packet.

4. The multiplexing apparatus of claim 3, wherein
the second converter is configured to further convert the TAI (International Atomic Time) time to a time with precision of a second frequency which is different from the first frequency,
the RTP (Real-Time Transport Protocol) packet includes a plurality of TTS (Timestamped Transport Stream) packets in place of the TS (Transport Stream) packets,
the first delay jitter absorber is configured to separate the TTS packets from the RTP packet, instead of separating the TS packets from the RTP packet,
the multiplexing apparatus further comprises:
a second delay jitter absorber configured to perform absorption of a delay and jitter, based on the time with the precision of the second frequency converted by the second converter, and based on timestamp information which is stamped on the TTS packets separated by the first delay jitter absorber, and to separate TS packets from the TTS packets;
a third converter configured to operate at the second frequency, and to count the TAI time reproduced by the time reproducer by using a counter which counts zero once again when the TAI time advances to a predetermined bit, thereby outputting an ultimately acquired value as a counter value for a TTS header; and
a TTS packet generator configured to add the counter value for the TTS header to the TS packet multiplexed by the multiplexer, thereby generating a TTS packet,
the separator is configured to separate, according to predetermined kinds, the TS packets separated by the second delay jitter absorber, in place of the TS packets separated by the first delay jitter absorber, and
the RTP packet generator is configured to add the counter value for the RTP header to the TTS packet generated by the TTS packet generator, in place of the TS packet multiplexed by the multiplexer, thereby generating the RTP packet.

5. The multiplexing apparatus of claim 3, further comprising:
a PCR packet generator configured to generate a PCR packet in which correction of time is made in accordance with the correction of the delay and the jitter, and to add the time for PCR, which is generated by the first converter, to the PCR packet,
wherein the multiplexer is configured to multiplex the PCR packet to which the time for PCR is added by the PCR packet generator, and the TS packets separated by the separator.

6. A broadcasting system including a plurality of systems which are switchable, comprising:

a first system including the encoder of claim 1, and a first multiplexing apparatus;
a second system including a second encoder of claim 1, and a second multiplexing apparatus; and
a system switching apparatus configured to execute switching between the first system and the second system.

7. A synchronization control apparatus applied to an encoder, comprising:
a time reproducer configured to receive an IP packet and to reproduce TAI (International Atomic Time) time from a PTP (Precision Time Protocol) packet included in the IP packet;
a first converter configured to determine a time length in which an STC (System Time Clock) counter value laps, to calculate a remainder of the time length relative to the TAI time, and to generate a time for PCR (Program Clock Reference) and a PTS (Presentation Time Stamp) value, based on the remainder;
a counter configured to operate at a first frequency, and to count the TAI time reproduced by the time reproducer by using a counter which counts zero once again when the TAI time advances to a predetermined bit, thereby outputting an ultimately acquired value as a counter value for an RTP (Real-Time Transport Protocol) header; and
an RTP packet generator configured to add the counter value for the RTP header to the TS packet generated by the encoder, thereby generating an RTP packet.

8. The synchronization control apparatus of claim 7, further comprising:
a second converter configured to operate at a second frequency which is different from the first frequency, and to count the TAI time reproduced by the time reproducer by using the counter which counts zero once again when the TAI time advances to a predetermined bit, thereby outputting an ultimately acquired value as a counter value for a TTS (Timestamped Transport Stream) header; and
a TTS packet generator configured to add the counter value for the TTS header to the TS packet generated by the encoder, thereby generating a TTS packet,
wherein the RTP packet generator is configured to generate the RTP packet by adding the counter value for the RTP header to the TTS packet generated by the TTS packet generator in place of the TS packet generated by the encoder.

9. A synchronization control apparatus applied to a multiplexing apparatus, comprising:
a time reproducer configured to communicate a PTP (Precision Time Protocol) packet and to reproduce TAI (International Atomic Time) time from the PTP packet;
a first converter configured to determine a time length in which an STC (System Time Clock) counter value laps, to calculate a remainder of the time length relative to the TAI time, and to generate a time for PCR (Program Clock Reference), based on the remainder;
a second converter configured to convert the TAI time to a time with precision of a first frequency;
a first delay jitter absorber configured to receive an IP packet, to perform, based on the time with the precision of the first frequency converted by the second converter, correction of a delay and jitter by using timestamp information which is stamped on an RTP (Real-Time Transport Protocol) packet including a plurality of TS (Transport Stream) packets in the IP packet, and to separate the TS packets from the RTP packet;

a counter configured to operate at the first frequency, and to count the TAI time reproduced by the time reproducer by using a counter which counts zero once again when the TAI time advances to a predetermined bit, thereby outputting an ultimately acquired value as a counter value for an RTP header; and an RTP packet generator configured to add the counter value for the RTP header to the TS packet separated by the first delay jitter absorber and multiplexed by the multiplexer, thereby generating an RTP packet.

10. The synchronization control apparatus of claim 9, wherein the second converter is configured to further convert the TAI (International Atomic Time) time to a time with precision of a second frequency which is different from the first frequency, the RTP (Real-Time Transport Protocol) packet includes a plurality of TTS Timestamped Transport Stream) packets in place of the TS (Transport Stream) packets, the first delay jitter absorber is configured to separate the TTS packets from the RTP packet, instead of separating the TS packets from the RTP packet, the synchronization control apparatus further comprises:

a second delay jitter absorber configured to perform absorption of a delay and jitter, based on the time with the precision of the second frequency converted by the second converter, and based on timestamp information which is stamped on the TTS packets separated by the first delay jitter absorber, and to separate TS packets from the TTS packets;

a third converter configured to operate at the second frequency, and to count the TAI time reproduced by the time reproducer by using a counter which counts zero once again when the TAI time advances to a predetermined bit, thereby outputting an ultimately acquired value as a counter value for a TTS header; and a TTS packet generator configured to add the counter value for the TTS header to the TS packet separated by the second delay jitter absorber and multiplexed by the multiplexer, thereby generating a TTS packet, and the RTP packet generator is configured to add the counter value for the RTP header to the TTS packet generated by the TTS packet generator, in place of the TS packet multiplexed by the multiplexing apparatus, thereby generating the RTP packet.

\* \* \* \* \*

UNITED STATES PATENT AND TRADEMARK OFFICE
CERTIFICATE OF CORRECTION

| | |
|---|---|
| PATENT NO. | : 11,252,215 B2 |
| APPLICATION NO. | : 16/722461 |
| DATED | : February 15, 2022 |
| INVENTOR(S) | : Tomoo Yamakage |

It is certified that error appears in the above-identified patent and that said Letters Patent is hereby corrected as shown below:

On the Title Page

Item (73), should read:
--(73) Assignees: Kabushiki Kaisha Toshiba, Minato-ku (JP);
     Toshiba Infrastructure Systems & Solutions Corporation, Kawasaki, (JP)--

Signed and Sealed this
Third Day of May, 2022

Katherine Kelly Vidal
*Director of the United States Patent and Trademark Office*